(12) United States Patent
Asai

(10) Patent No.: US 7,804,226 B2
(45) Date of Patent: Sep. 28, 2010

(54) POLYMER ACTUATOR

(75) Inventor: Katsuhiko Asai, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/338,094

(22) Filed: Dec. 18, 2008

(65) Prior Publication Data

US 2009/0127980 A1 May 21, 2009

Related U.S. Application Data

(63) Continuation of application No. PCT/JP2007/061862, filed on Jun. 13, 2007.

(30) Foreign Application Priority Data

Jun. 20, 2006 (JP) .............................. 2006-169615

(51) Int. Cl.
*H02N 2/00* (2006.01)

(52) U.S. Cl. .................. 310/328; 310/311; 310/323.16; 310/333; 310/800

(58) Field of Classification Search ................ 310/800, 310/333, 323.16, 328
See application file for complete search history.

(56) References Cited

U.S. PATENT DOCUMENTS

| 6,249,076 | B1 * | 6/2001 | Madden et al. ............. 310/363 |
| 2002/0130673 | A1 * | 9/2002 | Pelrine et al. ............... 324/727 |
| 2002/0195326 | A1 * | 12/2002 | Hunter et al. ............... 200/181 |
| 2006/0261709 | A1 * | 11/2006 | Kato et al. .................. 310/367 |
| 2007/0114116 | A1 * | 5/2007 | Nagai et al. ................. 200/181 |
| 2007/0247033 | A1 * | 10/2007 | Eidenschink et al. ........ 310/800 |

FOREIGN PATENT DOCUMENTS

| JP | 11-169393 | 6/1999 |
| JP | 2005-086982 | 3/2005 |
| JP | 2005-176412 | 6/2005 |
| JP | 2005-176428 | 6/2005 |
| JP | 2006-050780 | 2/2006 |
| JP | 2006-087182 | 3/2006 |
| WO | 2005/076452 | 8/2005 |

OTHER PUBLICATIONS

English version of International Preliminary Report on Patentability issued Feb. 19, 2009 in International (PCT) Application No. PCT/JP2007/061862 of which the present application is the U.S. National Stage.

(Continued)

*Primary Examiner*—Walter Benson
*Assistant Examiner*—Bryan P Gordon
(74) *Attorney, Agent, or Firm*—Wenderoth, Lind & Ponack, L.L.P.

(57) ABSTRACT

In a polymer actuator provided with a first polymer structural member having a conductive property, an electrolyte retention layer electrically connected to the first polymer structural member, and a second polymer structural member electrically connected to the first polymer structural member through the electrolyte retention layer interposed therebetween and having a conductive property, and by applying a potential difference between the first polymer structural member and the second polymer structural member, the first polymer structural member and the second polymer structural member are allowed to expand and contract, by displacement of the second polymer structural member, the potential difference between the first polymer structural member and the second polymer structural member is changed.

11 Claims, 16 Drawing Sheets

OTHER PUBLICATIONS

International Search Report issued Sep. 18, 2007 in the International (PCT) Application which is the parent of the present U.S. continuation application.

G. Wallace et al., "Factors Influencing Performance of Electrochemical Actuators Based on Inherently Conducting Polymers (ICPs)", Proceedings of SPIE, 2002, vol. 4695, pp. 8-16.

* cited by examiner

POLYMER ACTUATOR

This is a continuation application of International Application No. PCT/JP2007/061862, filed Jun. 13, 2007.

BACKGROUND OF THE INVENTION

I. Technical Field

The present invention relates to a polymer actuator which can achieve large expansion and contraction operations in a stable manner with a simple and inexpensive structure.

II. Description of the Related Art

Along with increasing demands for machines, such as house-service robots, which are operated closely to human beings, there have been ever-increasing expectations for artificial muscle actuators, which can be operated flexibly like human muscles. Candidates for the artificial muscle actuators include an actuator using a conductive polymer, an actuator using a polymer containing carbon fine particles (for example, see JP-A No. 2005-176412), an actuator using a polymer structural member containing carbon nanotubes (for example, see JP-A No. 2005-176428), and the like, and since these actuators utilize a phenomenon in which a structural member containing a polymer material is expanded and contracted in response to movements of ions, they are generally referred to as ionic polymer actuators.

An actuator, as shown in FIGS. 7A, 7B, and 7C, which generates a flexible deformation, has been proposed as one example of the artificial muscle actuator using a conductive polymer, which is a type of ionic polymer actuators. This actuator has a structure in which a solid-state electrolyte molded member 32 serving as an electrolyte retention layer is sandwiched by polyaniline film members 35a and 35b, which are polymer structural members using a conductive polymer. By turning a switch 37 on, a potential difference, set at a power supply 36, is applied between the polyaniline film members 35a and 35b so that, as shown in FIG. 7B, negative ions are inserted into one polyaniline film member 35b so as to be expanded, while negative ions are released from the other polyaniline film member 35a so as to be contracted, with the result that a flexible deformation is generated (for example, see JP-A No. 11-169393).

In this structure, the flexible deformation is generated by a difference of displacement amounts of the polyaniline film members 35a and 35b which are two conductive polymer films serving as electrodes, but in contrast, another structure has been known in which, by forming the solid-state electrolyte molded member 32 serving as the electrolyte retention layer by the use of a liquid or a gel-state material, the deformations of the polyaniline film members 35a and 35b, serving as both electrodes, are made so as not to be influenced by each other so that only the displacement of either one of the conductive polymer films 35a and 35b is taken out, and an actuator which executes expansion and contraction deformations is thus achieved. In this case, no conductive polymer structure is required for the electrode whose displacement is not utilized, and a metal electrode is mainly utilized therefor; however, it is also indicated that the displacement is increased by forming the conductive polymer structure on the metal electrode (for example, see Proceedings of SPIE, Vol. 4695, pages 8 to 16).

The principle by which the ionic polymer actuator is expanded and contracted is derived from not only a volume change due to such an insertion of ions, but also a structural change in polymer, electrostatic repulsion, and the like; and in any of these cases, a structure in which a potential difference is applied between two electrodes connected through an electrolyte retention layer interposed therebetween is used, and mutually corresponding phenomena are generated on the respective electrodes. Since such ionic polymer actuators generate a strain corresponding to that of a muscle upon application of a low voltage in a range of 2 to 3V, they are expected to be put into practical use as an artificial muscle.

However, since the ionic polymer actuator utilizes expanding and contracting operations of a flexible polymer structural member, shapes of the expanded state and contracted state are respectively changed upon application of a load to the actuator, with the result that the expansion and contraction range as the actuator is changed. For this reason, in general positional control, in either of the cases of no load, and application of a load, the operation range needs to be limited to a range capable of being reached by expanding and contracting operations; consequently, it becomes impossible to expand and contract the actuator to the maximum degree.

In order to solve these issues, it is necessary to change an operating state in response to an expanded or contracted state of the actuator. With respect to this method, a method for measuring a charge, a method using a plurality of sensors, a method for continuously applying a constant voltage, and the like are proposed.

The above method for measuring a charge is a method in which, since the displacement in the ionic polymer actuator depends on a charge in a polymer structural member or its corresponding number of ions, the number of incoming and outgoing charges to and from the polymer structural member are measured, thereby evaluating the expanded or contracted state. In this method, however, measuring errors are accumulated because addition and subtraction of the number of the charges are executed each time the actuator is operated. Consequently, a measuring system such as a high precision charge-measuring device needs to be used, resulting in defects of complex circuits and high costs.

Next, the above method using a plurality of sensors includes, for example, a method in which a power sensor is used in addition to a displacement sensor so that the expanded or contracted state is evaluated by using a relationship between a load and an expansion and contraction range which have been preliminarily measured. However, this method requires a power sensor additionally to cause a defect of high costs.

Then, the above method for continuously applying a constant voltage is a method by which a voltage, which is adjusted to such a degree as not to cause degradation of the polymer structural member or the electrolyte retention layer, but to allow the polymer structural member to expand or contract, is continuously applied. With this arrangement, the polymer structural member approaches a predetermined expanded or contracted state as time elapses. In this method, however, it is difficult to determine the timing in which an applied voltage is changed, and there is a defect that, when enough time is given until the displacement in the polymer structural member has positively stabilized, the operation of the actuator becomes extremely slow, while, when the applied voltage is changed earlier, the expanded or contracted state of the polymer structural member is brought into a transient response state, causing degradation of the correlation to the applied voltage. Moreover, in the case when response speeds are different between the expansion side and the contraction side, an issue arises in which, upon changing a voltage periodically to provide reciprocating operations, a drifting phenomenon of displacement toward one of the sides tends to occur.

SUMMARY OF THE INVENTION

Therefore, in view of the above points, an object of the present invention is to provide a polymer actuator which can achieve the maximum expanding and contracting operations independent of the load, without adding extra systems, such as a charge measuring device or a power sensor.

In order to achieve the above object, the present invention has the following constitutions.

In accordance with a first aspect of the present invention, a polymer actuator is provided which comprises: a first polymer structural member having a conductive property; an electrolyte retention layer electrically connected to the first polymer structural member; and a second polymer structural member electrically connected to the first polymer structural member through the electrolyte retention layer interposed therebetween and having a conductive property, wherein by applying a potential difference between the first polymer structural member and the second polymer structural member, the first polymer structural member and the second polymer structural member are allowed to expand and contract respectively, and by displacement of the second polymer structural member, the potential difference between the first polymer structural member and the second polymer structural member is changed.

In accordance with the present invention, it is possible to obtain the polymer actuator which can achieve the maximum expanding and contracting operations independent of the load, without adding extra systems, such as a charge measuring device or a power sensor. That is, in accordance with the present invention, the potential difference between the first polymer structural member and the second polymer structural member is changed by displacement of the second polymer structural member which is electrically connected to the first polymer structural member, but merely has a mechanically weak connection to the first polymer structural member so that the actuator can be operated in response to an expanded or contracted state of the second polymer structural member corresponding to the expanded or contracted state of the first polymer structural member independent of a load applied to the first polymer structural member. Therefore, it is possible to obtain the polymer actuator which can achieve the maximum expanding and contracting operations independent of the load, without adding extra systems, such as a charge measuring device or a power sensor.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1A:
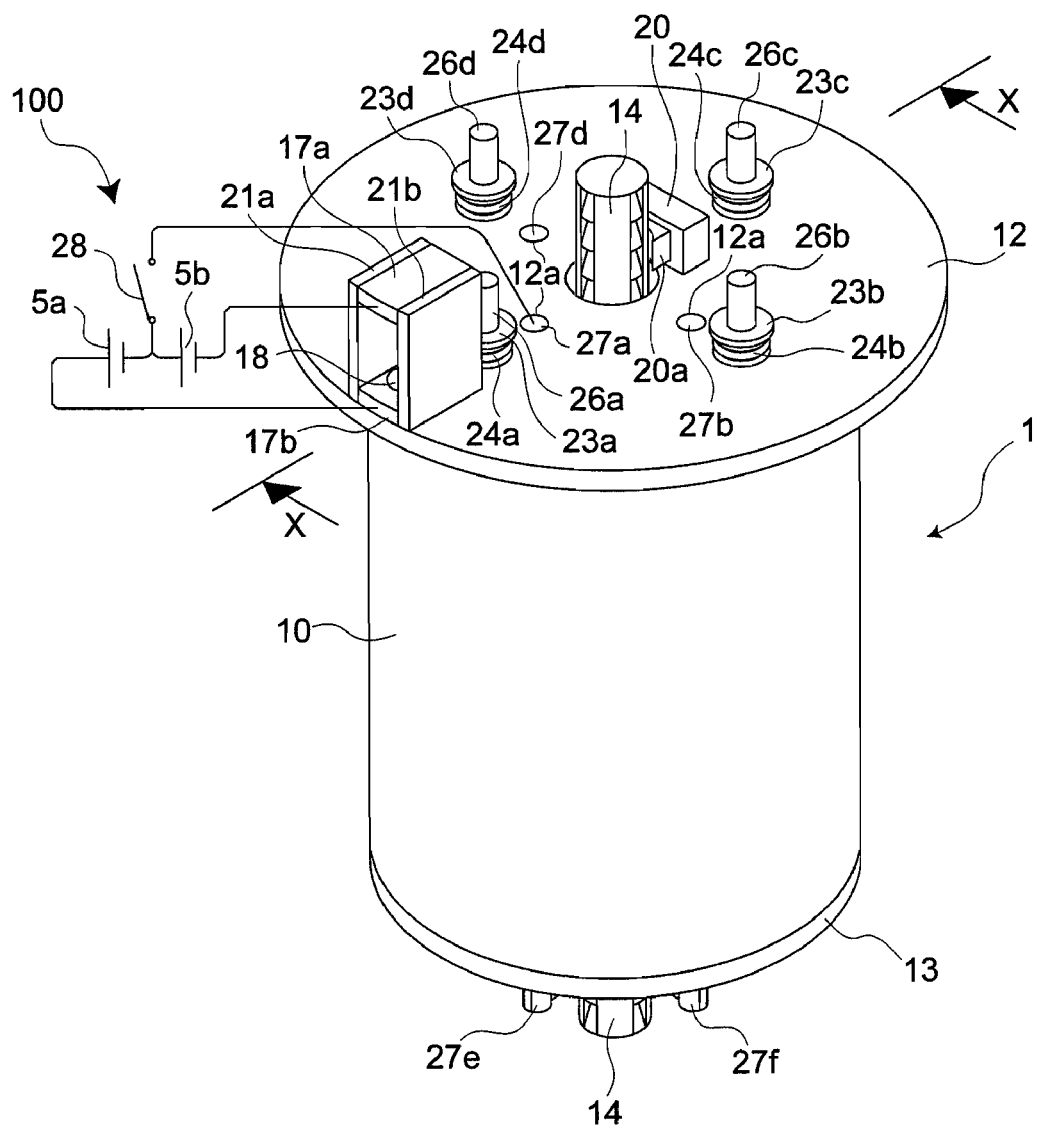
FIG. 1A is a perspective view which schematically shows an artificial muscle actuator in accordance with a first embodiment of the present invention.

Before the description of the present invention proceeds, it is to be noted that like parts are designated by like reference numerals throughout the accompanying drawings.

Prior to the detailed description of the embodiments of the present invention based upon the drawings, various aspects for the present invention will be explained.

The following description will discuss embodiments in accordance with the present invention in detail by reference to figures.

According to a first aspect of the present invention, there is provided a polymer actuator characterized by comprising: a first polymer structural member having a conductive property; an electrolyte retention layer electrically connected to the first polymer structural member; and a second polymer structural member electrically connected to the first polymer structural member through the electrolyte retention layer interposed therebetween and having a conductive property, in which by applying a potential difference between the first polymer structural member and the second polymer structural member, the first polymer structural member and the second polymer structural member are allowed to expand and contract respectively, and this polymer actuator is characterized in that, by displacement of the second polymer structural member, the potential difference between the first polymer structural member and the second polymer structural member is changed.

In accordance with this constitution, since the potential difference between the first polymer structural member and the second polymer structural member is changed by displacement of the second polymer structural member which is electrically connected to the first polymer structural member, but merely has a mechanically weak connection to the first polymer structural member, so that the actuator can be operated in response to an expanded or contracted state of the second polymer structural member corresponding to the expanded or contracted state of the first polymer structural member independent of load applied to the first polymer structural member. Therefore, it becomes possible to obtain a polymer actuator which can achieve large expansion and contraction operations stably with a simple and inexpensive structure.

According to a second aspect of the present invention, there is provided a polymer actuator characterized by comprising: a first polymer structural member having a conductive property; an electrolyte retention layer electrically connected to the first polymer structural member; and a second polymer structural member electrically connected to the first polymer structural member through the electrolyte retention layer interposed therebetween and having a conductive property, in which by applying a potential difference between the first polymer structural member and the second polymer structural member, the first polymer structural member and the second polymer structural member are allowed to expand and contract respectively, and wherein the polymer actuator further comprises a displacement detection unit for detecting a displacement of the second polymer structural member, and a potential-difference switching unit for switching the potential difference to be applied between the first polymer structural member and the second polymer structural member to a different potential difference based upon the displacement detected by the displacement detection unit.

In accordance with this constitution, the actuator can be controlled in response to an expanded or contracted state of the second polymer structural member corresponding to the expanded or contracted state of the first polymer structural member independent of a load applied to the first polymer structural member. Therefore, it becomes possible to obtain a polymer actuator which can achieve large expansion and contraction operations stably by using a simple and inexpensive structure.

According to a third aspect of the present invention, there is provided a polymer actuator as defined in either one of the first and second aspects, wherein either one or both of the first polymer structural member having a conductive property and the second polymer structural member having a conductive property are structural members containing an organic conductive polymer.

In accordance with this constitution, since the polymer itself has a conductive property, it is not necessary to mix another substance therewith so that a polymer actuator having a polymer structural member with more stable characteristics can be obtained.

According to a fourth aspect of the present invention, there is provided a polymer actuator as defined in any one of the first to third aspects, characterized in that either one or both of the first polymer structural member having a conductive property and the second polymer structural member having a conductive property are allowed to contain a carbon material having a conductive property.

In accordance with this constitution, since a polymer structural member capable of executing expanding and contracting operations can be obtained even when the polymer itself does not have a conductive property, it is possible to more easily obtain a polymer actuator.

According to a fifth aspect of the present invention, there is provided a polymer actuator as defined in the fourth aspect, characterized in that the carbon material having a conductive property is a tube-shaped carbon material.

In accordance with this constitution, it is possible to obtain a polymer actuator which ensures a conductive property of the polymer structural member in a stable manner even upon carrying out expanding and contracting operations.

According to a sixth aspect of the present invention, there is provided a polymer actuator as defined in the fourth aspect, characterized in that the carbon material having a conductive property is a particle-shaped carbon material.

In accordance with this constitution, the amount of carbon material inside the polymer structural member can be easily adjusted so that polymer actuators having polymer structural members with various characteristics can be easily obtained.

According to a seventh aspect of the present invention, there is provided a polymer actuator as defined in any one of the first to sixth aspects, characterized in that the first polymer structural member having a conductive property and the second polymer structural member having a conductive property are structural members made from polymers having the same characteristics to the ambient environment.

In accordance with this constitution, since characteristics to the ambient environment, such as a temperature change, that is, influences by the ambient environment, such as a temperature change, can be seen on the first polymer structural member and the second polymer structural member in the same manner, the correlation of an expanded or contracted state between the first polymer structural member and the second polymer structural member becomes higher so that it is possible to obtain a polymer actuator which can achieve expansion and contraction operations in a stable manner.

According to an eighth aspect of the present invention, there is provided a polymer actuator as defined in any one of the first to seventh aspects, wherein the potential-difference switching unit is constituted such that, when the second polymer structural member is contracted greater or equal to a predetermined dimension, the potential difference to be applied between the first polymer structural member and the second polymer structural member is switched to a first potential difference which allows the second polymer structural member to carry out an expanding operation, while, in contract, when the second polymer structural member is expanded greater or equal to a predetermined dimension, the potential difference is switched to a second potential difference that allows the second polymer structural member to carry out a contraction operation.

In accordance with this constitution, since the polymer actuator continuously contracting is allowed to continuously expand at the stage where contraction is greater or equal to the predetermined dimension, and since the polymer actuator continuously expanding is then allowed to continuously contract again at the stage where expansion is greater or equal to the predetermined dimension, it is possible to obtain a polymer actuator which can carry out large expansion and contraction operations continuously.

According to a ninth aspect of the present invention, there is provided a polymer actuator as defined in the eighth aspect, wherein the potential-difference switching unit is a switch for mechanically switching the potential difference to be applied between the first polymer structural member and the second polymer structural member, by an expanding or contracting operation of the second polymer structural member between a first potential difference and a second potential difference.

In accordance with this constitution, it is possible to obtain a polymer actuator which can achieve large expansion and contraction operations in a stable manner with a simple and inexpensive structure.

According to a tenth aspect of the present invention, there is provided a polymer actuator as defined in any one of the first to ninth aspects, wherein the potential difference to be applied between the first polymer structural member and the second polymer structural member is always applied by a DC power supply.

In accordance with this constitution, it is possible to obtain a polymer actuator which can achieve large expansion and contraction operations in a stable manner with a simple and inexpensive structure.

According to an eleventh aspect of the present invention, there is provided a polymer actuator as defined in any one of the first to tenth aspects, wherein an output of the first polymer structural member is constituted to be transmitted to an outside through a mechanism for transmitting an output virtually only in one direction of expansion or contraction.

In accordance with this constitution, by expanding or contracting the polymer actuator continuously, the polymer actuator is allowed to achieve larger displacements.

According to a twelfth aspect of the present invention, there is provided a polymer actuator as defined in the eleventh aspect, wherein the mechanism for transmitting the output only in one direction is a mechanism comprising a ratchet mechanism.

In accordance with this constitution, since the output of the first polymer structural member can be easily transmitted only in one direction, it is possible to obtain a polymer actuator capable of achieving larger displacements.

According to a thirteenth aspect of the present invention, there is provided a polymer actuator as defined in the eleventh aspect, wherein the mechanism for transmitting the output only in one direction in a mechanism comprising a mechanism for changing a transmitting force in cooperation with the electric potential difference to be applied between the above first polymer structural member and second polymer structural member.

In accordance with this constitution, since it is not necessary to provide a new control device for a mechanism for adjusting a frictional force, and it becomes possible to obtain a polymer actuator which can achieve a large displacement by using a simple and inexpensive structure.

Referring to figures, the following description will discuss embodiments of the present invention in detail.

First Embodiment

Figure 1B:
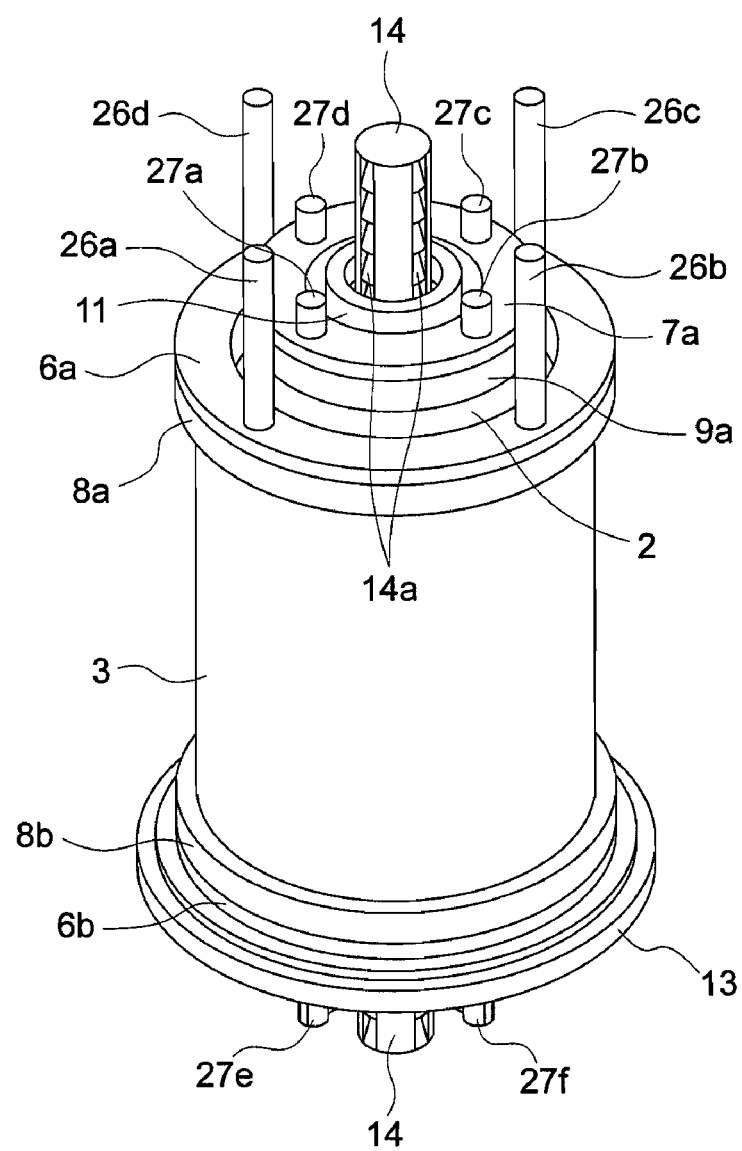
FIG. 1B is a perspective view which schematically shows the artificial muscle actuator in accordance with the first embodiment of the present invention.

FIG. 1A is a perspective view which schematically shows an artificial muscle actuator 1 which is one example of a polymer actuator in accordance with a first embodiment of the present invention, and FIG. 1B is a perspective view which shows the inside thereof. Moreover, FIGS. 2A, 2B, 2C, 2D, and 2E are X-X line cross-sectional views of FIG. 1A which show the operations of the artificial muscle actuator 1. Moreover, FIGS. 3A and 3B respectively show an A-A line cross-sectional view and a B-B line cross-sectional view of FIG. 2A.

In FIGS. 2A to 2E, reference numerals 2 and 3 represent tube-shaped films, made from a conductive polymer and placed on the inside and outside, each of which is one example of a polymer structural member having a conductive property. The conductive polymer, which forms the tube-shaped films 2 and 3 made from a conductive polymer and placed on the inside and outside, is a material which is allowed to expand and contract in response to an oxidation-reduction reaction, and examples thereof include such as polypyrrole, polyaniline, or polymethoxyaniline, and polypyrrole is preferably used because it causes a large displacement. Moreover, the thickness of the conductive polymer film in the tube-shaped films 2 and 3 made from a conductive polymer and located on the inside and outside is preferably set to be about several ten μm. When the thickness becomes thinner than this level, the films become undesirably weak in strength, and when the thickness becomes thicker than this level, the resulting structure is not desirable because ions fail to go into, or come out of the inside of the tube-shaped films 2 and 3 made from a conductive polymer.

The tube-shaped films 2 and 3, made from a conductive polymer and located on the inside and outside, are electrically connected to each other, with an electrolyte solution 4 interposed therebetween which serves as an electrolyte retention layer with which a space, surrounded by an insulating outer tube 10, an insulating inner tube 11, an insulating upper lid 12, and an insulating lower lid 13, is filled being interposed therebetween. An ionic solution is preferably used as the electrolyte solution 4 because it is nonvolatile and has a wide electric potential window which corresponds to a range of electric potentials causing no electrolysis.

Of the two tube-shaped films 2 and 3 made from a conductive polymer and located on the inside and outside, the inside tube-shaped film 2 of conductive polymer has its one end clamped by a conductive holding ring 7a having an L-letter shape in its cross section with four conductive rod-shaped protrusions 27a, 27b, 27c, and 27d, and a conductive or insulating pressing ring 9a, with the other end being also clamped by a conductive or insulating holding ring 7b having an L-letter shape in its cross section with four conductive or insulating rod-shaped protrusions 27e, 27f, 27g, and 27h, and a conductive or insulating pressing ring 9b. Although the rod-shaped protrusion 27h is not shown in FIGS. 1A to 2B, the rod-shaped protrusions 27e, 27f, 27g, and 27h are placed at such positions as to be made face to face with the rod-shaped protrusions 27a, 27b, 27c, and 27d respectively. The conductive holding ring 7a is secured onto the insulating upper lid 12, with the conductive rod-shaped protrusions 27a, 27b, 27c, and 27d being fitted to four fitting holes 12a of the upper lid 12 (that is, the upper end of the tube-shaped film 2 of conductive polymer on the inside is secured to the upper lid 12), while the holding ring 7b, which has its four rod-shaped protrusions 27e, 27f, 27g, and 27h made to penetrate four through holes 13b of the lower lid 13, with its radial direction restricted by sealing members 22a, 22b, 22c, and 22d formed on the four through holes 13b on the lower lid 13, is held so as to freely move in the axis direction (that is, the lower end side of the tube-shaped film 2 of conductive polymer located on the inside is allowed to move relative to the lower lid 13). Although no sealing members 22b and 22d are shown in FIGS. 1A to 2B, the sealing members 22a, 22b, 22c, and 22d are arranged in a manner so as to correspond to the respective rod-shaped protrusions 27e, 27f, 27g, and 27h. Moreover, ratchet claws 16a, 16b, 16c, and 16d (in which 16b and 16d are not shown) are respectively formed on the rod-shaped protrusions 27e, 27f, 27g, and 27h, and each of them is meshed with a rod-shaped conductive or insulating movable member 14, with at least four ratchet teeth 14a being prepared in the axial direction and on the outer periphery thereof with intervals of 90 degrees. That is, the ratchet claws 16a, 16b, 16c, and 16d and the four ratchet teeth 14a are allowed to form a ratchet mechanism. With this constitution, when the holding ring 7b is raised in FIG. 2A, the driving force is transmitted to the movable body 14 through the claws 16a, 16b, 16c, and 16d meshed with the teeth 14a of the movable body 14; however, when the holding ring 7b is lowered, the driving force is not transmitted to the movable body 14 because the claws 16a, 16b, 16c, and 16d are not meshed with the teeth 14a of the movable body 14. Therefore, in the first embodiment, the output of the tube-shaped film 2 of conductive polymer located on the inside is constituted to be outputted externally, through the ratchet mechanism which virtually serves as one example of a mechanism for transmitting an output of a contraction only in one direction, as will be described in detail later.

Moreover, the movable body 14 is held by bearings 15a and 15b disposed inside the inner tube 11 near the upper lid 12 and the lower lid 13, in a radial direction so as not to be disturbed in its movement in an axis direction.

In the same manner, one end of the tube-shaped film 3 of conductive polymer on the outside is clamped by a conductive holding ring 6a having an L-letter shape in its cross section with four conductive rod-shaped protrusions 26a, 26b, 26c, and 26d, and a conductive or insulating pressing ring 8a, while the other end is also clamped by an insulating or conductive holding ring 6b having an L-letter shape in its cross section with four insulating or conductive rod-shaped protrusions 26e, 26f, 26g, and 26h, and an insulating or conductive pressing ring 8b. The holding ring 6b is secured to the insulating lower lid 13, with the rod-shaped protrusions 26e, 26f, 26g, and 26f being fitted to four fitting holes 13a of the lower lid 13 (that is, the lower end side of the tube-shaped film 3 of conductive polymer on the outside is secured to the lower lid 13), while the four rod-shaped protrusions 26a, 26b, 26c, and 26d of the holding ring 6a are allowed to protrude outside through the four through holes 12b of the upper lid 12 (that is, the upper end side of the tube-shaped film 3 of conductive polymer on the outside is allowed to move relative to the upper lid 12). An electric terminal 18 having a built-in permanent magnet is electrically connected to the rod-shaped protrusion 26a functioning as one example of a displacement detection unit for detecting a displacement of the tube-shaped film 3 of conductive polymer on the outside through a conductive elastic member (for example, a linear member made of spring steel) 19 interposed therebetween. This electric terminal 18 is constituted to serve as a switch which is always made in electric contact with either of the electrodes 17a and 17b on the upper side and the lower side which are conductive and made of a magnetic material, by a magnetic force of the built-in permanent magnet so that the electric terminal 18, the elastic member 19, the upper-side and lower-side electrodes 17a, 17b, and the DC power supplies 5a, 5b are allowed to form one example of a control mechanism or a potential-difference switching unit 100. The magnetic force of the electric terminal 18 and the elastic force of the elastic member 19 are adjusted so that the upper-side and lower-side electrodes 17a and 17b with which the electric terminal 18 is made in contact are inverted from each other at the time when the tube-shaped film 3 of conductive polymer on the outside is completely expanded, as well as at the time when it is completely contracted. In other words, the electric terminal 18 (see FIG. 2D), electrically connected to the upper side electrode 17a, is made in contact with the lower side electrode 17b (see FIG. 2A), at the time when the tube-shaped film 3 of conductive polymer on the outside has been completely contracted; in contrast, the electric terminal 18 (see FIG. 2A), electrically connected to the lower side electrode 17b, is made in contact with the upper side electrode 17a (see FIG. 2D), at the time when the tube-shaped film 3 of conductive polymer on the outside has been completely expanded. Moreover, the electrode 17a and the electrode 17b are held by insulating side plates 21a and 21b connected to the upper lid 12, and also electrically connected to each other through DC power supplies 5a and 5b which are series-connected. Furthermore, a wiring which is made conductive to the holding ring 7a is electrically connected between the DC power supplies 5a and 5b through the switch 28 and the rod-shaped protrusion 27a interposed therebetween. Thus, mutually different potentials can be electrically connected to the holding ring 7a by the DC power supplies 5a and 5b through the switch 28 interposed therebetween.

Moreover, stoppers 23a, 23b, 23c, and 23d are respectively secured to the rod-shaped protrusions 26a, 26b, 26c, and 26d, and coil springs 24a, 24b, 24c, and 24d, each serving as one example of the elastic member, are sandwiched between the respective stoppers 23a, 23b, 23c, and 23d and the upper lid 12 in a manner so as to be compressed. According to the above arrangement, forces in the expanding direction are always applied to the tube-shaped film 3 of conductive polymer on the outside by the coil springs 24a, 24b, 24c, and 24d so that, when the tube-shaped film 3 of conductive polymer on the outside is expanded, a driving force in the expanding direction is also generated without being buckled.

Figure 2A:
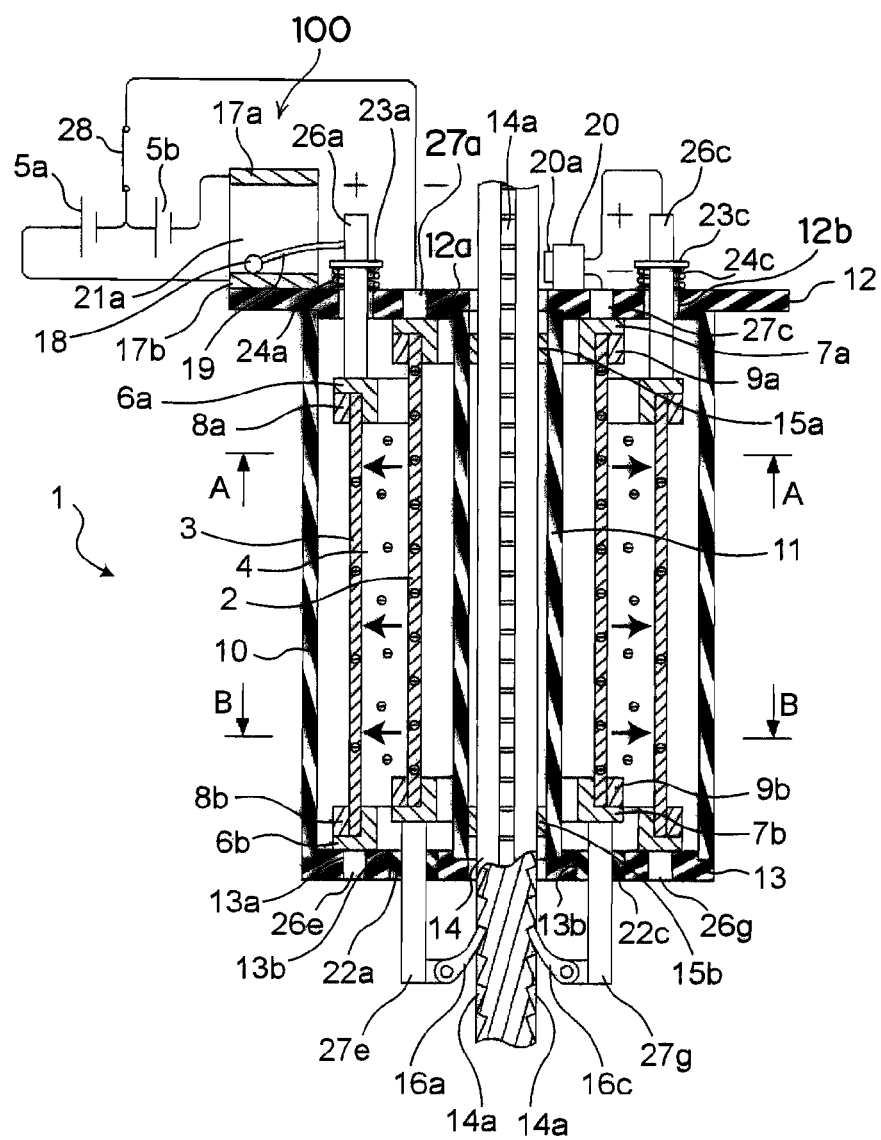
FIG. 2A is an X-X line cross-sectional view of FIG. 1A which schematically shows the artificial muscle actuator in accordance with the first embodiment of the present invention.
Figure 3A:
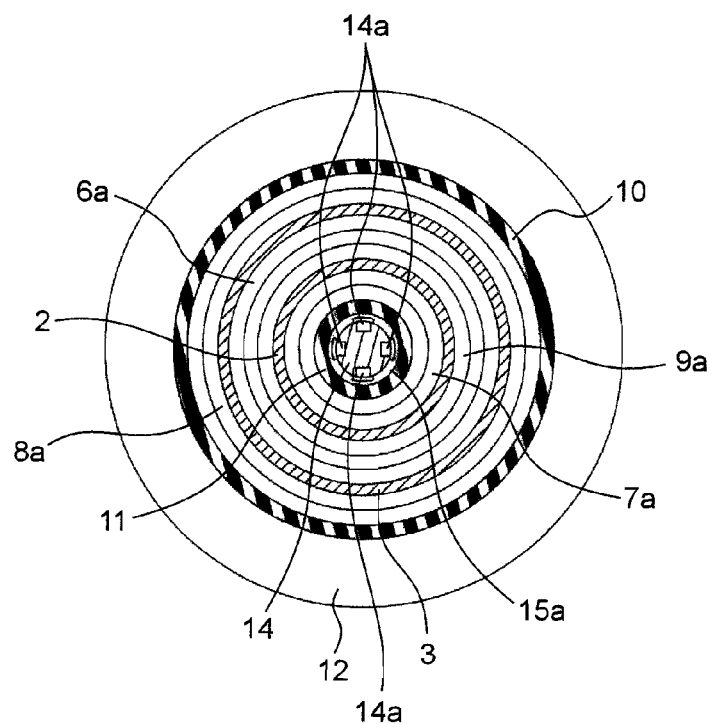
FIG. 3A is an A-A line cross-sectional view in FIG. 2A.
Figure 3B:
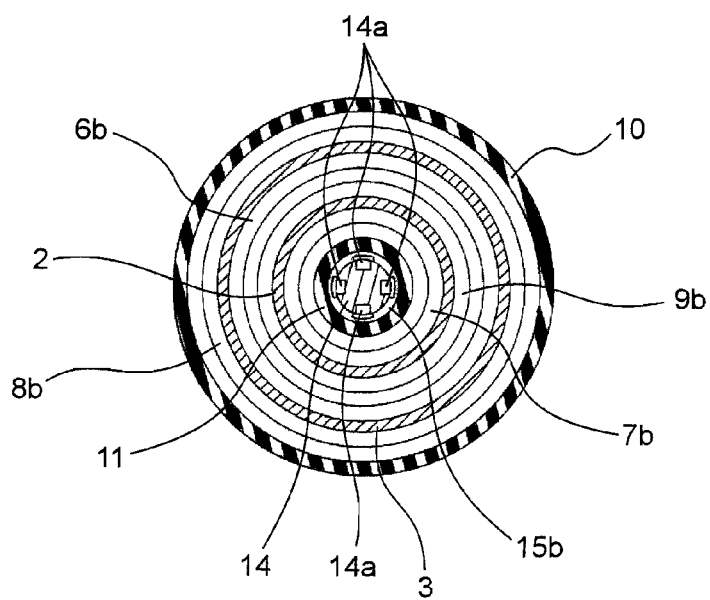
FIG. 3B is a B-B line cross-sectional view in FIG. 2A.

On the other hand, with respect to the tube-shaped film 2 of conductive polymer on the inside, a force in the expanding direction is applied by the self-weight of the movable body 14 and the like, when the artificial muscle actuator 1 is disposed in an up-and-down direction so that the upper side of FIG. 2A is located on the upper side in the vertical direction; however, in the same manner as in the tube-shaped film 3 of conductive polymer on the outside, of course, a force in the expanding direction may be applied thereto by using stoppers and coil springs. This arrangement to apply the force in the expanding direction is preferably used because it becomes possible to apply a force in the expanding direction to the tube-shaped film 2 of conductive polymer on the inside, without depending on the gravity direction. In other words, without setting the disposing direction of the artificial muscle actuator 1 to the up-and-down direction as described above, the artificial muscle actuator 1 may be disposed in a desired direction such as a lateral direction so that the degree of freedom in the layout can be expanded desirably. Moreover, the coil springs may be formed into an integral structure with the tube-shaped films 2 and 3 of conductive polymer so that a force in the expanding direction can always be generated by the coil springs. This arrangement is preferable because it eliminates the necessity of an excessive space required for installing coil springs. Moreover, in the case when the conductivity of the coil springs exceeds the conductivity of the tube-shaped films 2 and 3 of conductive polymer, the resulting integrated structure provides the same effects as those obtained when the conductivities of the tube-shaped films 2 and 3 of conductive polymer are improved so that it is also possible to obtain the effect for improving the response characteristic of the artificial muscle actuator 1.

Moreover, a solenoid 20, which is a holding mechanism used for regulating the movement of the movable body 14 in the axis direction, is placed on the upper lid 12, and the same voltage as the voltage to be applied between the tube-shaped films 2 and 3 made of conductive polymer is applied thereto through the holding rings 6a and 7a interposed therebetween.

The solenoid 20, which is formed by attaching a movable iron core into a coil, is an actuator which allows a shaft 20a coupled to the movable iron core to move forward or backward depending on the direction of an input voltage so as to be made in contact with and released from the outer face of the movable body 14. The solenoid 20 houses the shaft 20a when a voltage from the DC power supply 5a is applied thereto, and the shaft 20a is consequently released from the outer face of the movable body 14 so that the movable body 14 is allowed to freely move in the axis direction (open state), while, when a voltage from the DC power supply 5b is applied thereto, it allows the shaft 20a to protrude to be made in contact with the outer face of the movable body 14 so that the movable body 14 is regulated in its movement in the axis direction by a frictional force (held state). Here, the shaft 20a is formed into such a shape that it is selectively made in contact with the smooth outer diameter portion of the movable body 14. This structure is preferable because, even upon occurrence of a slip relative to the movable body 14 by an external force, the shaft 20a is made less vulnerable to damage. Here, the shaft 20a may be formed into such a shape so as to engage with the teeth 14a of the movable body 14. This structure is preferable because a greater holding force can be obtained.

Next, the following description will discuss functions of this artificial muscle actuator 1.

The reasons for expansion and contraction of the tube-shaped films 2 and 3 made from conductive polymer include: outgoing and incoming anions (negative ions), outgoing and incoming cations (positive ions), changes in the polymer structural member, or the like, and the explanation for operation principle, shown in FIGS. 2A, 2B, 2C, 2D, and 2E, describes that main mechanisms of deformation in the material system of polypyrrole or the like are derived from doping and undoping of anions; therefore, the following description will discuss outgoing and incoming anions. Here, by turning-on the switch 28, the artificial muscle actuator 1 is allowed to carry out repetitive operations, except for the position of the movable body 14; therefore, the following description will discuss one cycle thereof.

FIG. 2A shows a state in which, as one of the states of the repetitive operations, the tube-shaped film 2 of conductive polymer on the inside is expanded, with the tube-shaped film 3 of conductive polymer on the outside being contracted. In this state, a large number of anions are inserted into the tube-shaped film 2 of conductive polymer on the inside, while only few anions are inserted into the tube-shaped film 3 of conductive polymer on the outside. Since the tube-shaped film 3 of conductive polymer on the outside has been contracted, the electric terminal 18 is pressed onto the lower electrode 17b by a magnetic force, with the result that a voltage generated by the DC power supply 5a is applied between the holding ring 6a and the holding ring 7a. Anions are inserted into the tube-shaped film 3 of conductive polymer on the outside electrically connected to the holding ring 6a to which a positive electric potential has been applied so that the tube-shaped film 3 of conductive polymer on the outside is expanded, while anions are released from the tube-shaped film 2 of conductive polymer on the inside which is electrically connected to the holding ring 7a to which a negative electric potential has been applied so that the tube-shaped film 2 of conductive polymer on the inside is gradually contracted. That is, anions are transferred in a direction indicated by an arrow in FIG. 2A. This state is continued to bring a state shown in FIG. 2B.

Figure 2B:
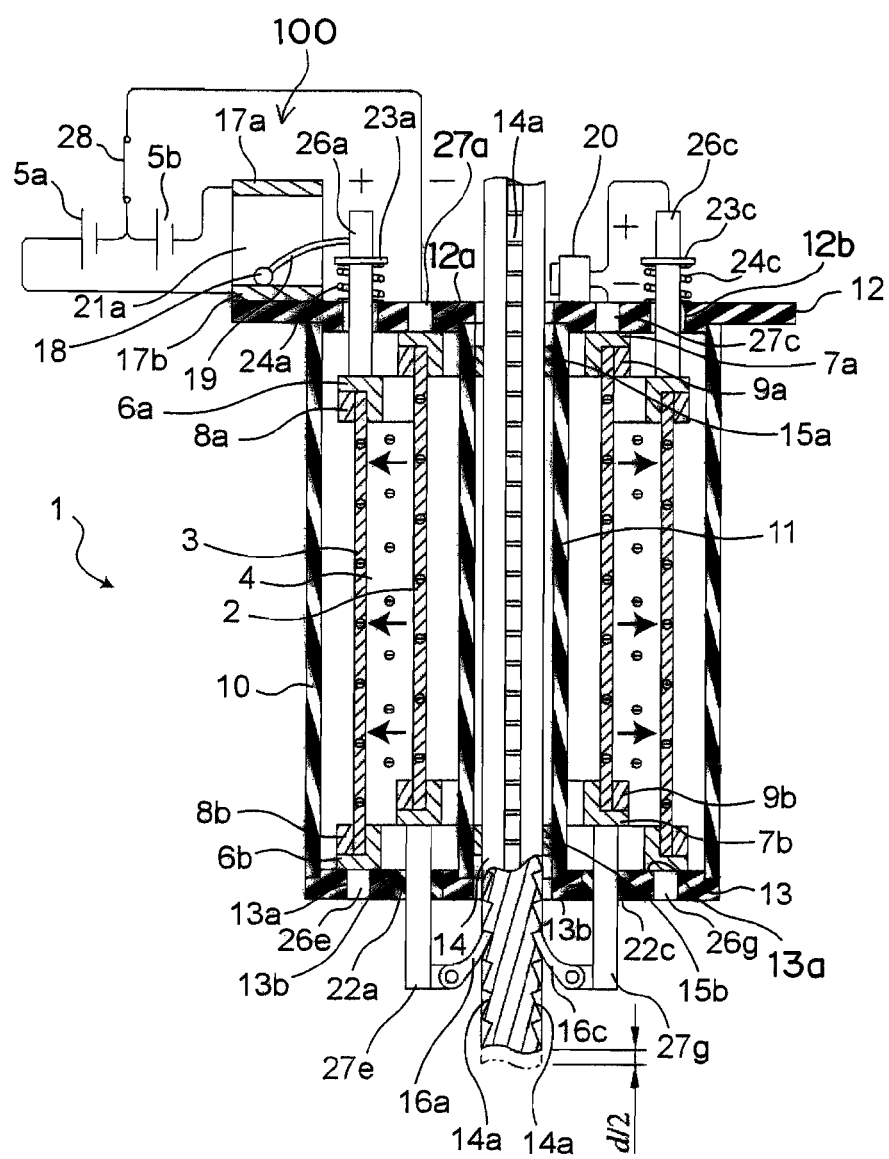
FIG. 2B is an X-X line cross-sectional view of FIG. 1A which schematically shows the artificial muscle actuator in accordance with the first embodiment of the present invention.

FIG. 2B shows a state in which the tube-shaped film 2 of conductive polymer on the inside has been contracted from the state of FIG. 2A by half the largest displacement d generated by the tube-shaped film 2 of conductive polymer on the inside during the repetitive operations, that is, by a displacement (d/2). In comparison with FIG. 2A, since the tube-shaped film 2 of conductive polymer on the inside has been contracted by the displacement (d/2), the holding ring 7b, the rod-shaped protrusions 27a, 27b, 27c, and 27d, and the ratchet claws 16a, 16b, 16c, and 16d, electrically connected to the tube-shaped film 2 of conductive polymer on the inside, are raised relative to the outer tube 10 during its contraction, with the movable body 14 being simultaneously raised relative to the outer tube 10. The lower end position of the movable body 14 in FIG. 2A is indicated by a two-dot chain line on the lower side of FIG. 2B. Moreover, a solenoid 20 to which a voltage of the DC power supply 5a is applied is brought into an open state to house the shaft 20a so as not to intervene with the movement of the movable body 14. Here, since the tube-shaped film 3 of conductive polymer on the outside has been expanded, the holding ring 6a is raised together with the tube-shaped film 3 of conductive polymer on the outside so that a force derived from the elastic force of the elastic member 19 is also applied to the electric terminal 18 upward electrically connected to the holding ring 6a through the elastic member 19 interposed therebetween. In this state, however, since the magnetic force of the electric terminal 18 exceeds the elastic force of the elastic member 19, the voltages to be applied to the tube-shaped film 2 of conductive polymer on the inside and the tube-shaped film 3 of conductive polymer on the outside are kept unchanged, with the result that the tube-shaped film 3 of conductive polymer on the outside is continuously expanded, with anions being inserted thereto, while the tube-shaped film 2 of conductive polymer on the inside is contracted, with anions being released therefrom, so that the sequence proceeds to a state shown in FIG. 2C.

Figure 2C:
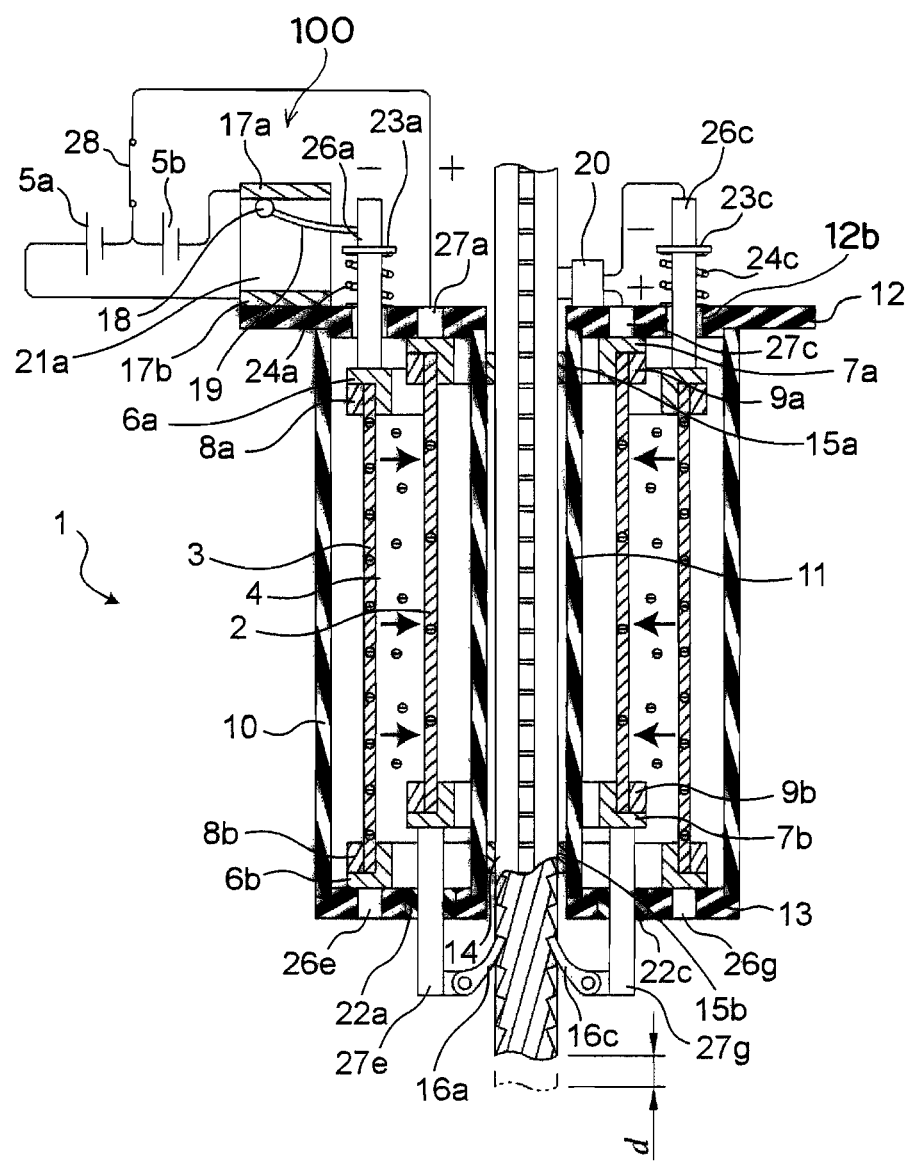
FIG. 2C is an X-X line cross-sectional view of FIG. 1A which schematically shows the artificial muscle actuator in accordance with the first embodiment of the present invention.

FIG. 2C shows a state in which the tube-shaped film 2 of conductive polymer on the inside has been further contracted from the state of FIG. 2B (in other words, by a displacement d from the state of FIG. 2A), while the tube-shaped film 3 of conductive polymer on the outside is expanded so that the elastic force of the elastic member 19 has exceeded the magnetic force of the electric terminal 18. Up to this state, the tube-state film 2 of conductive polymer on the inside is contracted, while the movable body 14 is continuously raised correspondingly. On the other hand, as the holding ring 6a is continuously raised as the tube-shaped film 3 of conductive polymer on the outside is expanded, and at the time when the elastic force of the elastic member 19 has exceeded the magnetic force of the electric terminal 18, the portion to be made in contact with the electric terminal 18 is changed from the lower side electrode 17b to the upper side electrode 17a so that a voltage, generated by the DC power supply 5b, is applied between the holding ring 6a and the holding ring 7a. For this reason, the direction of reaction (direction of outgoing or incoming anions) is inverted from this time on, and anions are inserted to the tube-shaped film 2 of conductive polymer on the inside, while anions are released from the tube-shaped film 3 of conductive polymer on the outside, so that in a manner reversed from the foregoing process, the tube-shape film 2 of conductive polymer on the inside is expanded, while the tube-shaped film 3 of conductive polymer on the outside is contracted. Here, the solenoid 20 to which the voltage from the DC power supply 5b is now applied is kept in a held state, with its shaft 20a protruding toward the movable body 14, so that the shaft 20a is made in contact with the outer face of the movable body 14 to intervene with the movement of the movable body 14. This state progresses so that the sequence proceeds to a state shown in FIG. 2D.

Figure 2D:
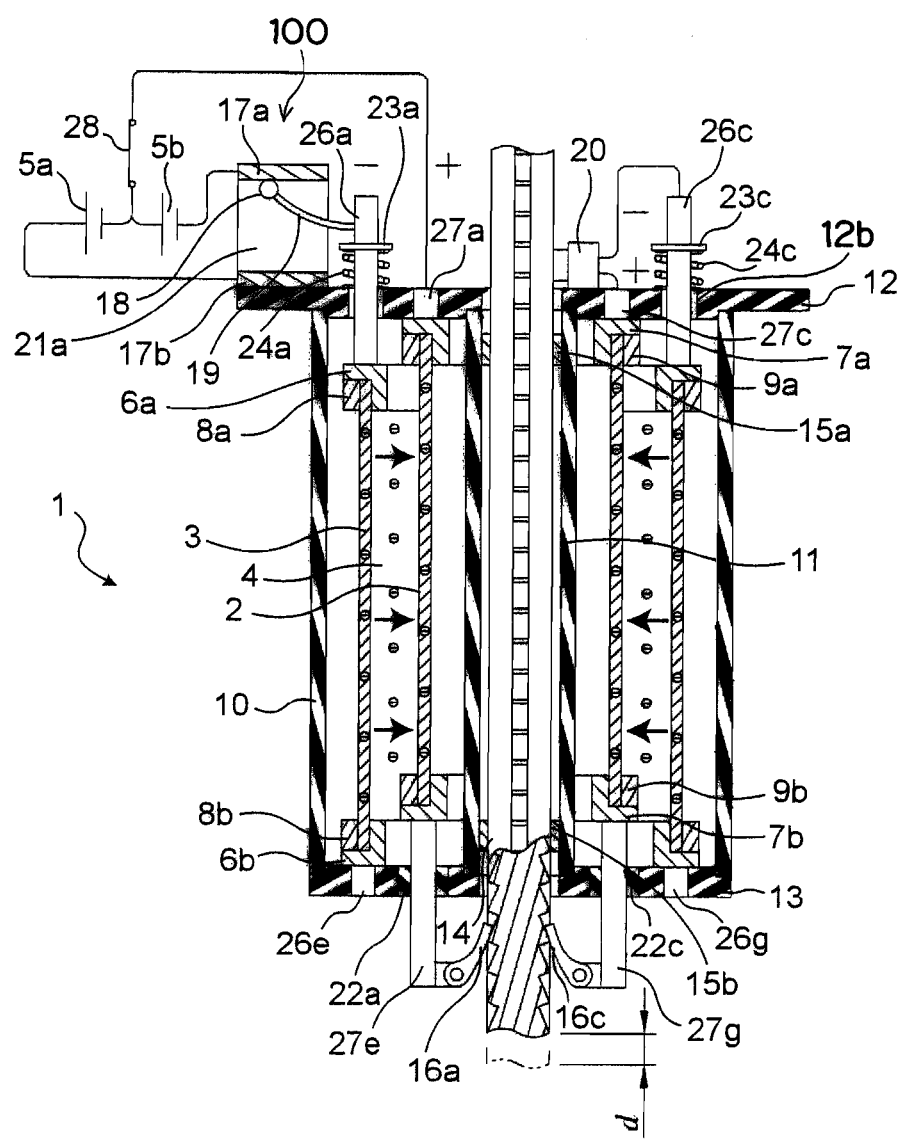
FIG. 2D is an X-X line cross-sectional view of FIG. 1A which schematically shows the artificial muscle actuator in accordance with the first embodiment of the present invention.

FIG. 2D shows a state in which the tube-shaped film 2 of conductive polymer on the inside has been expanded from the state of FIG. 2C by half the largest displacement d generated by the tube-shaped film 2 of conductive polymer on the inside during the repetitive operations, that is, by a displacement (d/2). Since the tube-shaped film 2 of conductive polymer on the inside has been expanded from the state shown in FIG. 2C, the holding ring 7b, the ratchet claws 16a, 16b, 16c, and 16d are not engaged with the teeth 14a of the movable body 14, although the holding ring 7b, the rod-shaped protrusions 27a, 27b, 27c, and 27d, and the ratchet claws 16a, 16b, 16c, and 16d have been lowered, so that the movable body 14, held by the solenoid 20, is kept at the corresponding position (in other words, the lower end position of the movable body 14 is still kept at the position raised by the displacement d from the lower end position of the movable body 14 indicated by a two-dot chain line in FIG. 2A, in the same manner as in FIG. 2C). In contrast, since the tube-shaped film 3 of conductive polymer on the outside has been contracted, the holding ring 6a is lowered relative to the outer tube 10 together with the tube-shaped film 3 of conductive polymer on the outside so that the electric terminal 18 is subjected to a downward force derived from the elastic force of the elastic member 19. In this state, however, since the magnetic force of the electric terminal 18 exceeds the elastic force of the elastic member 19, the voltages to be applied to the tube-shaped film 2 of conductive polymer on the inside and the tube-shaped film 3 of conductive polymer on the outside are kept unchanged, with the result that the tube-shaped film 2 of conductive polymer on the inside is continuously expanded, with anions being inserted thereto, while the tube-shaped film 3 of conductive polymer on the outside is contracted, with anions being released therefrom, so that the sequence proceeds to a state shown in FIG. 2E.

Figure 2E:
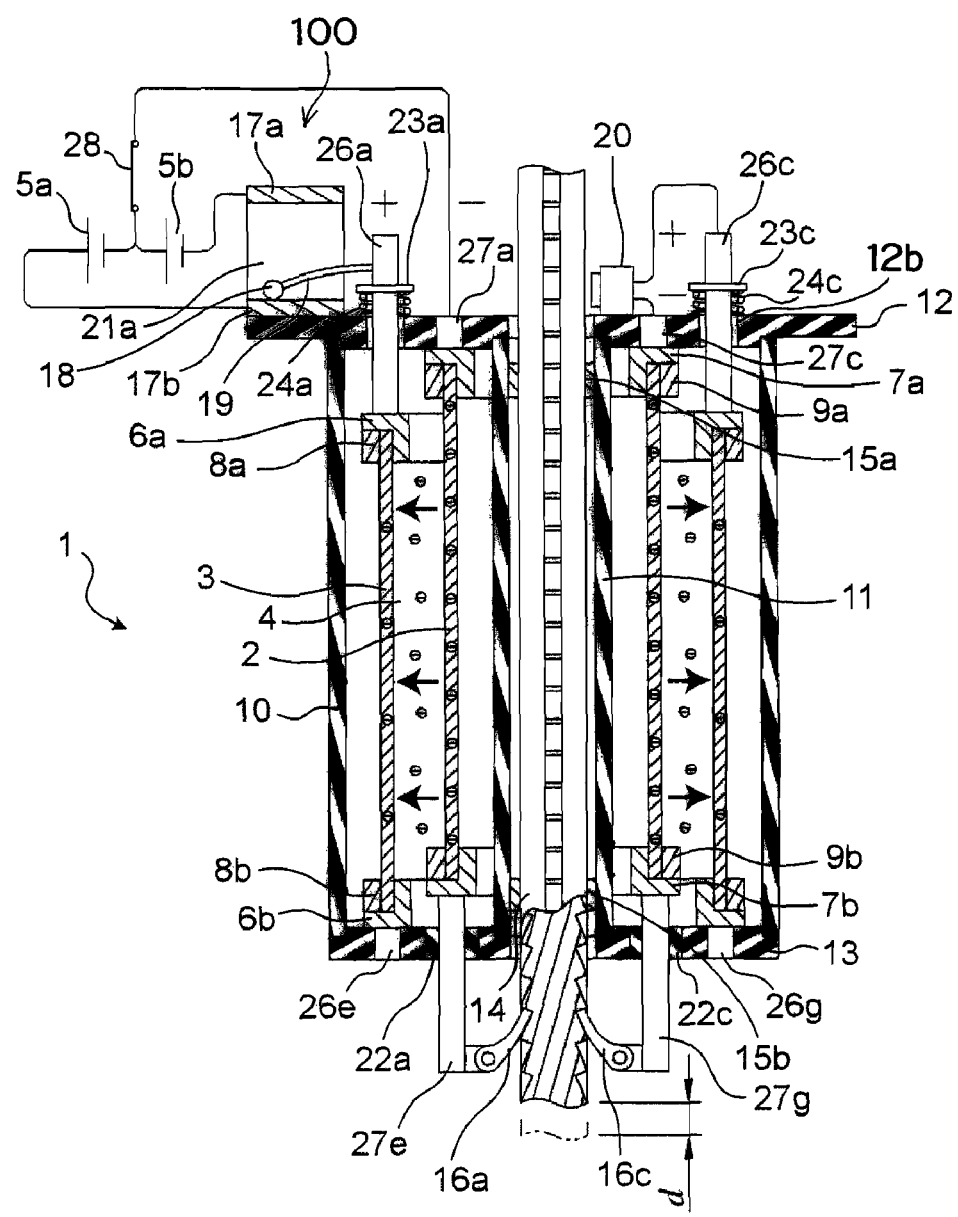
FIG. 2E is an X-X line cross-sectional view of FIG. 1A which schematically shows the artificial muscle actuator in accordance with the first embodiment of the present invention.

FIG. 2E shows a state in which the tube-shaped film 2 of conductive polymer on the inside has been further expanded from the state of FIG. 2D, while the tube-shaped film 3 of conductive polymer on the outside is further contracted, so that the elastic force of the elastic member 19 has exceeded the magnetic force of the electric terminal 18. This state is the same as that of FIG. 2A except that a displacement corresponding to the value d is induced in the movable body 14. In this state, since the elastic force of the elastic member 19 has exceeded the magnetic force of the electric terminal 18, the portion to be made in contact with the electric terminal 18 is again changed from the upper side electrode 17a to the lower side electrode 17b so that a voltage, generated by the DC power supply 5a, is again applied between the holding ring 6a and the holding ring 7a. Accordingly, the solenoid 20 is also changed into the open state, with its shaft 20a being housed therein. Here, anions are inserted into the tube-shaped film 3 of conductive polymer on the outside electrically connected to the holding ring 6a to which a positive potential is applied by the voltage generated by the DC power supply 5a so that the tube-shaped film 3 is expanded, while anions are released from the tube-shaped film 2 of conductive polymer on the outside electrically connected to the holding ring 7a to which a negative potential is applied so that the tube-shaped film 2 is contracted. By repeating this sequence of cycles, a displacement exceeding the maximum displacement d generated by the tube-shaped film 2 of conductive polymer on the inside is induced in the movable body 14. In other words, even if the maximum displacement d is given by one cycle, a displacement 2d which is twice the maximum displacement d can be generated by repeating the above cycle two times; thus, a displacement which exceeds the maximum displacement d generated by the tube-shaped film 2 of conductive polymer on the inside, by executing one cycle. This operation is available because, with the position of the movable body 14 which has been moved by the maximum displacement d generated by the tube-shaped film 2 of conductive polymer on the inside by one cycle being held by the solenoid 20, the maximum displacement d, generated by the tube-shaped film 2 of conductive polymer on the inside in the next cycle, can be added to the movable body 14.

In the above cycle, the length of the tube-shaped film 2 of conductive polymer on the inside varies depending on a load to be applied to the movable body 14, and with respect to the state as to what extent the tube-shaped film 2 of conductive polymer on the inside is expanded or contracted to, such a state is determined by the amount of anions which have been inserted into the tube-shaped film 2 of conductive polymer on the inside. That is, the state in which anions have been sufficiently inserted corresponds to the expanded state, and the state in which anions have been sufficiently released corresponds to the contracted state. Here, the tube-shaped film 2 of conductive polymer on the inside is electrically connected to the tube-shaped film 3 of conductive polymer on the outside through the electrolyte solution 4 so as to form one portion of an electric circuit including the DC power supply 5a or 5b; thus, in response to the insertion and release of anions to and from the tube-shaped film 2 of conductive polymer on the inside, the release and insertion of anions are also carried out from and to the tube-shaped film 3 of conductive polymer on the outside. Moreover, since no mechanical interaction is exerted between the tube-shaped film 2 of conductive polymer on the inside and the tube-shaped film 3 of conductive polymer on the outside because of their contact through the electrolyte solution 4, it becomes possible to estimate what extent the tube-shaped film 2 of conductive polymer on the inside is expanded or contracted to, based upon the displacement of the tube-shaped film 3 of conductive polymer on the outside which is operated under a known load. In this case, the tube-shaped film 2 of conductive polymer on the inside and the tube-shaped film 3 of conductive polymer on the outside are desirably formed by using materials (for example, polymer materials) having the same characteristics to the ambient environment. The reason for this is because, by receiving characteristics (influences from external factors) of the ambient environment, such as an atmosphere temperature, in the same manner, the correlation in the expanding and contracting operations can be improved. With respect to the electric capacities of the tube-shaped film 2 of conductive polymer on the inside and the tube-shaped film 3 of conductive polymer on the outside, the capacity of the tube-shaped film 3 of conductive polymer on the outside is desirably designed to exceed the capacity of the tube-shaped film 2 of conductive polymer on the inside. The reason for this is because, in the case when the capacity of the tube-shaped film 3 of conductive polymer on the outside is less than the capacity of the tube-shaped film 2 of conductive polymer on the inside, the contraction and expansion of the tube-shaped film 2 of conductive polymer on the inside might be restricted upon expansion or contraction of the tube-shaped film 3 of conductive polymer on the outside, with the result that the capability of the tube-shaped film 2 of conductive polymer on the inside might be not exerted completely. In the present embodiment, by displacement of the tube-shaped film 3 of conductive polymer on the outside in response to the expanded state or contracted state of the tube-shaped film 2 of conductive polymer on the inside, the electric terminal 18 is switched between the electrodes 17a and 17b in its electric contact so that the tube-shaped film 2 of conductive polymer on the inside can be reciprocatingly operated within the maximum amplitude (here, the amplitude width corresponds to the maximum displacement d) between the expanded state and the contracted state of the tube-shaped film 2 of conductive polymer on the inside, independent of the load applied to the movable body 14. In this case, the DC power supplies 5a and 5b, which are inexpensive in comparison with AC power supplies, are utilized, that is, a simple-potential difference switching unit, constructed by the tube-shaped film 3 of conductive polymer on the outside, the electric terminal 18, and the electrodes 17a and 17b etc., are utilized. In particular, in the case when the rod-shaped protrusion 26a, connected to the tube-shaped film 3 of conductive polymer on the outside, is used so as to function as the displacement detection unit, it is considered that this structure forms a very simple and inexpensive structure, in comparison with the structure in which the displacement and the load of the conductive polymer film are measured by using an external sensor so that the expanded and contracted states are determined, from the viewpoint that the tube-shaped film 3 of conductive polymer on the outside forms the counter electrode originally required for operating the tube-shaped film 2 of conductive polymer on the inside. Moreover, by combining simple structures, such as the claws 16a, 16b, 16c, and 16d, the movable body 14, and the solenoid 20 etc., with each other, it becomes possible to further achieve a displacement which is greater than the displacement generated by the tube-shaped film 2 of conductive polymer on the inside.

As described above, in accordance with the first embodiment, since the potential difference between the tube-shaped film 2 of conductive polymer on the inside serving as one example of the first polymer structural member and the tube-shaped film 3 of conductive polymer on the outside serving as one example of the second polymer structural member is changed in response to a displacement of the tube-shaped film 3 of conductive polymer on the outside which is electrically connected to the tube-shaped film 2 of conductive polymer on the inside, but merely has a mechanically weaker connection to the tube-shaped film 2 of conductive polymer on the inside; therefore, since the actuator can be operated in response to the expanded and contracted states of the tube-shaped film 3 of conductive polymer on the outside which correspond to the expanded and contracted states of the tube-shaped film 2 of conductive polymer on the inside, independent of the load to be applied to the tube-shaped film 2 of conductive polymer on the inside, it is possible to generate the maximum expanding and contracting operations in the first polymer structural member independent of the load, without adding extra systems, such as a charge measuring device or a power sensor. Moreover, since the driving force is transmitted through the engagement between the claws 16a, 16b, 16c, and 16d and the teeth 14a of the movable body 14, it is possible to obtain a polymer actuator which can achieve a displacement which exceeds the displacement generated by the expansion and contraction of the tube-shaped films 2 and 3 made of conductive polymer films on the inside and the outside.

Here, with respect to the mechanism for transmitting a driving force in one direction to the movable body 14, not limited to the present embodiment in which a driving ratchet mechanism is used, with the solenoid 20 being used for the holding process, any combinations of the prior art techniques may be utilized as long as the same function can be achieved. Moreover, with respect to the structure in which the potential difference to be applied between the tube-shaped films 2 and 3 of conductive polymer on the inside and the outside is used so as to operate the solenoid 20 also, the potential difference is not directly operated, but may be utilized as a command voltage.

Second Embodiment

Figure 4:
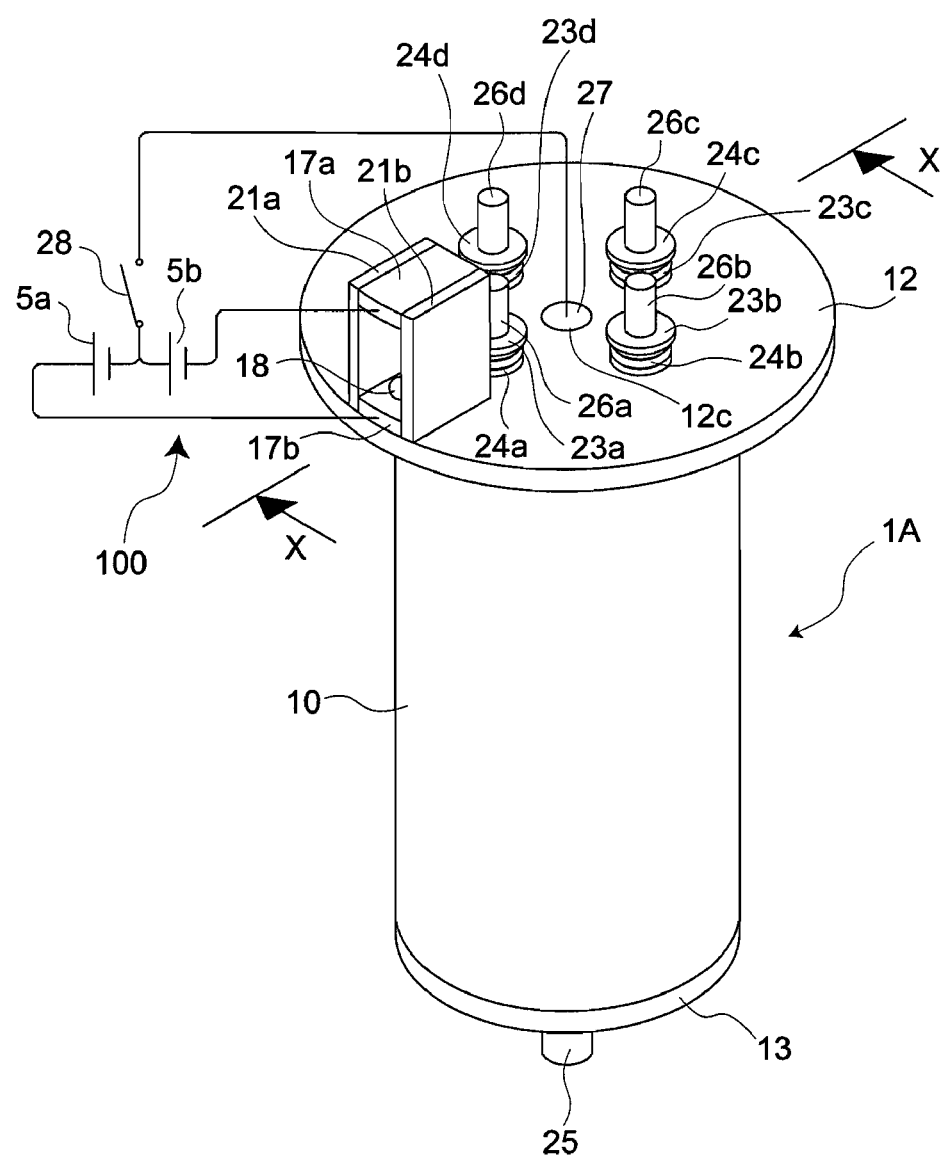
FIG. 4 is a perspective view which schematically shows an artificial muscle actuator in accordance with a second embodiment of the present invention.
Figure 5A:
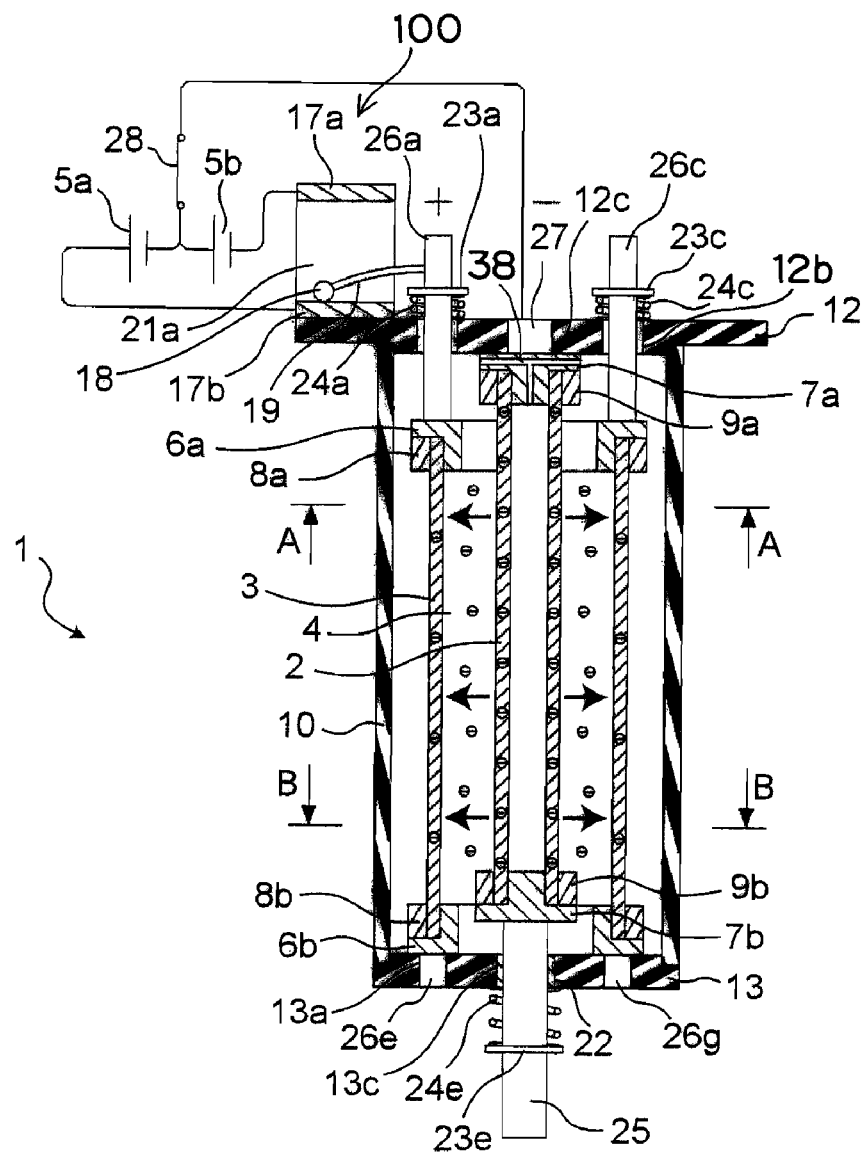
FIG. 5A is a cross-sectional view which schematically shows the artificial muscle actuator in accordance with the second embodiment of the present invention.
Figure 5B:
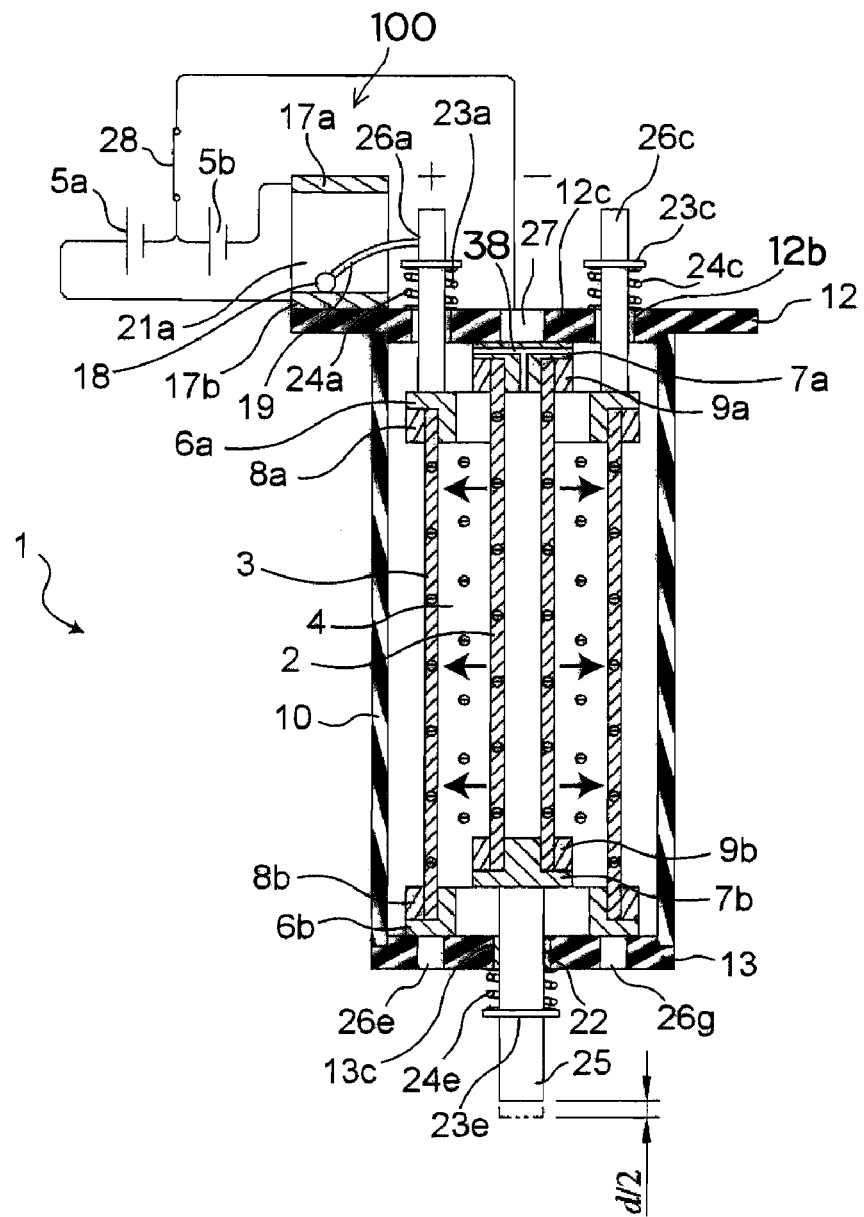
FIG. 5B is a cross-sectional view which schematically shows the artificial muscle actuator in accordance with the second embodiment of the present invention.
Figure 5C:
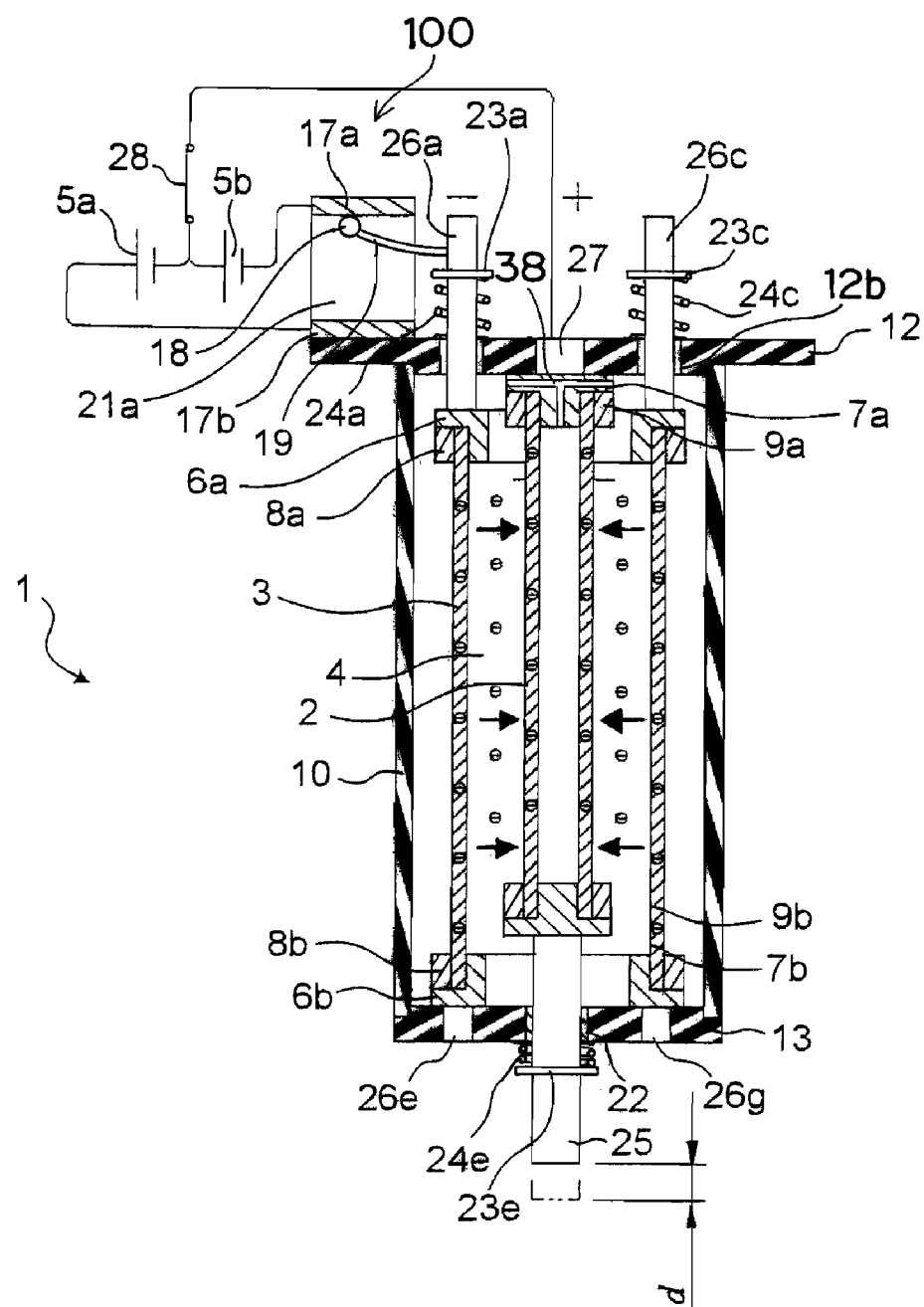
FIG. 5C is a cross-sectional view which schematically shows the artificial muscle actuator in accordance with the second embodiment of the present invention.
Figure 5D:
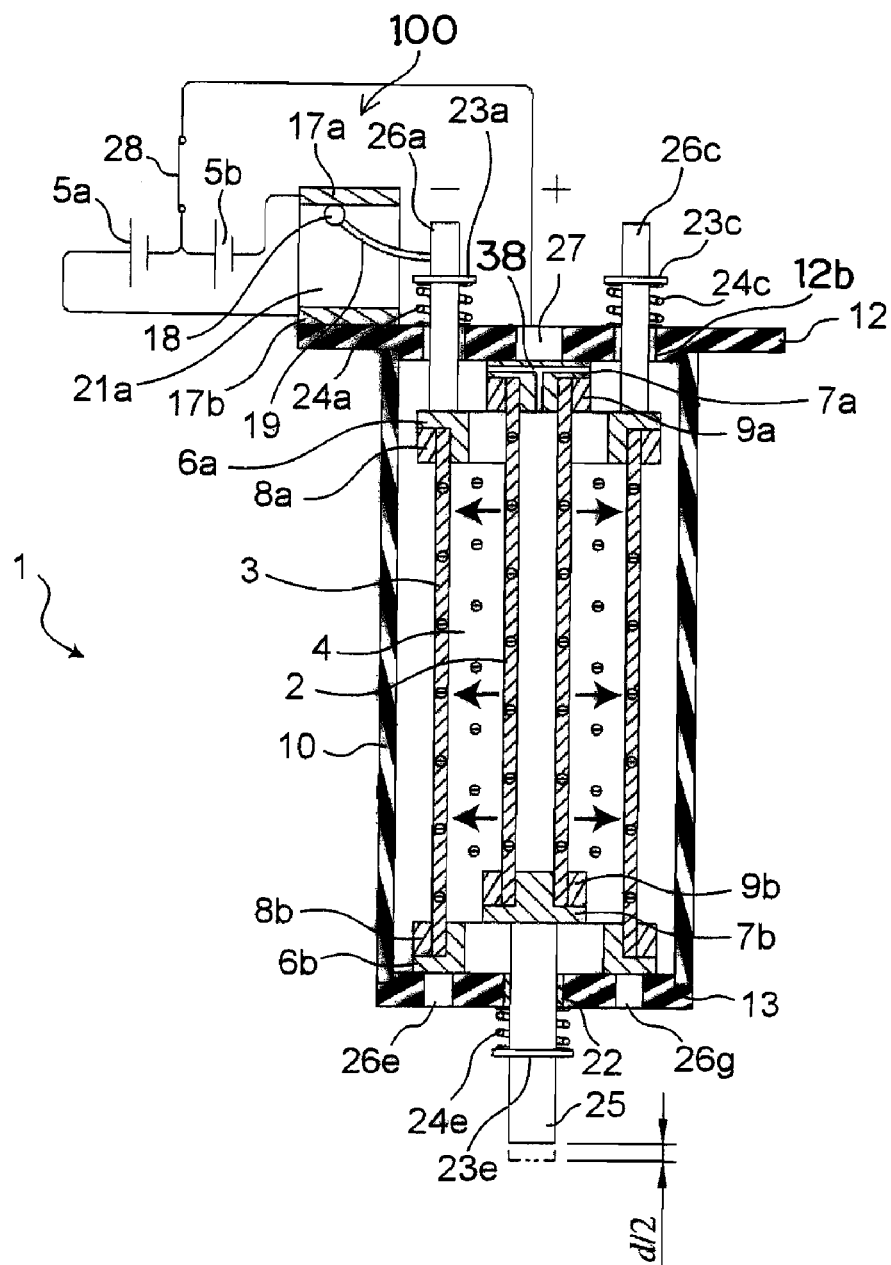
FIG. 5D is a cross-sectional view which schematically shows the artificial muscle actuator in accordance with the second embodiment of the present invention.
Figure 5E:
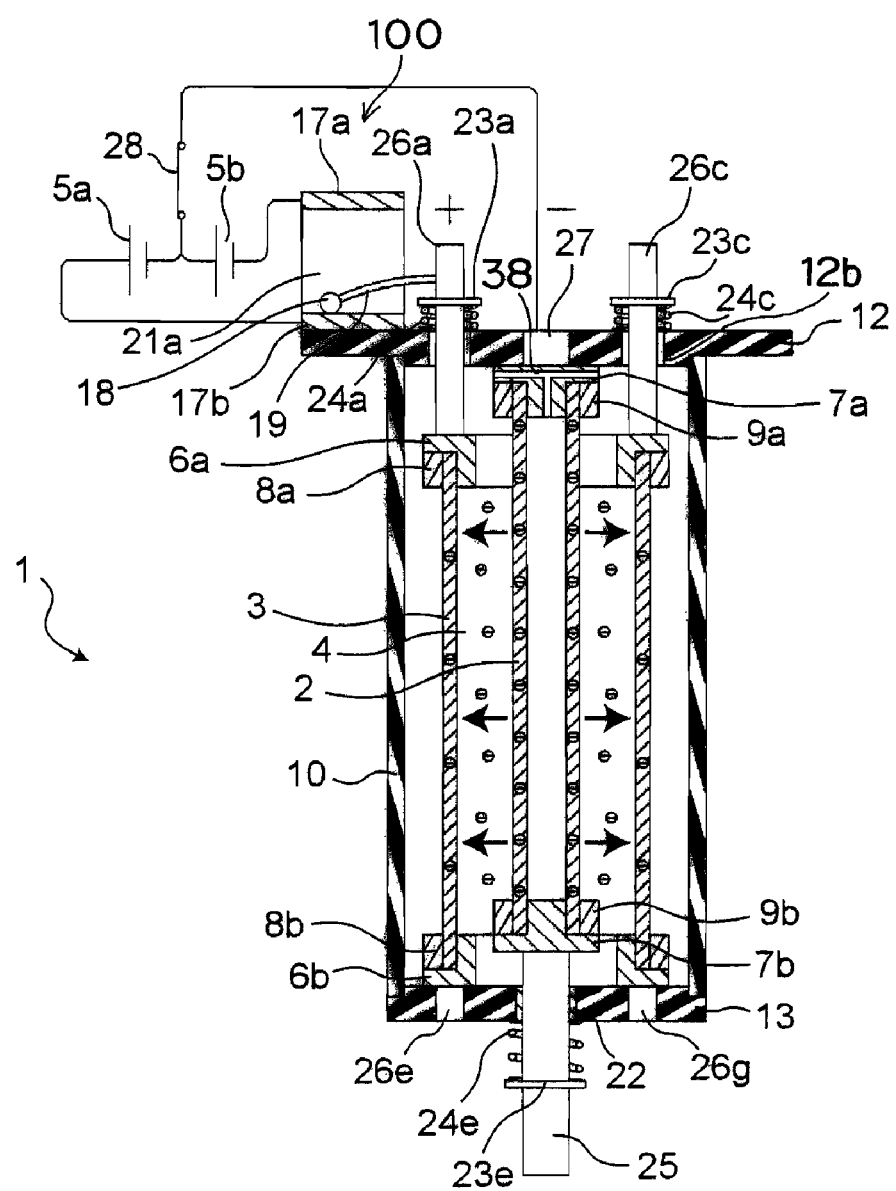
FIG. 5E is a cross-sectional view which schematically shows the artificial muscle actuator in accordance with the second embodiment of the present invention.
Figure 6A:
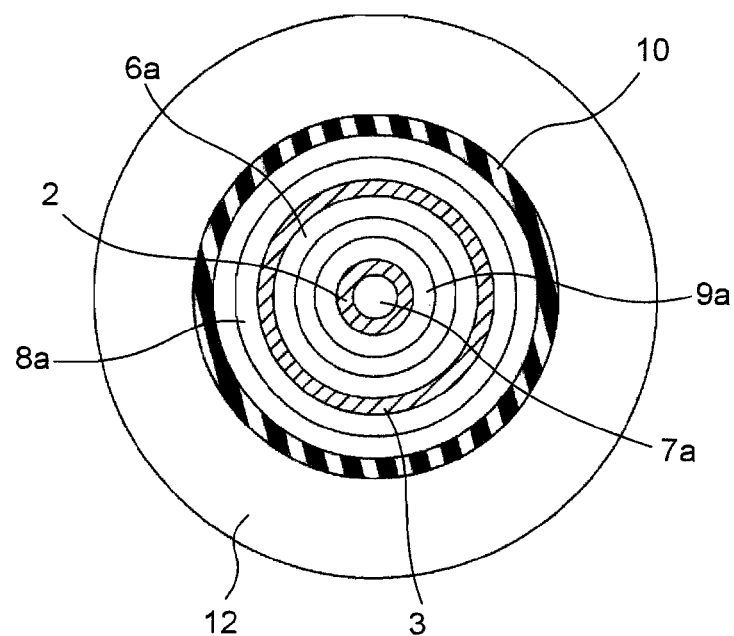
FIG. 6A is an A-A line cross-sectional view in FIG. 5A.
Figure 6B:
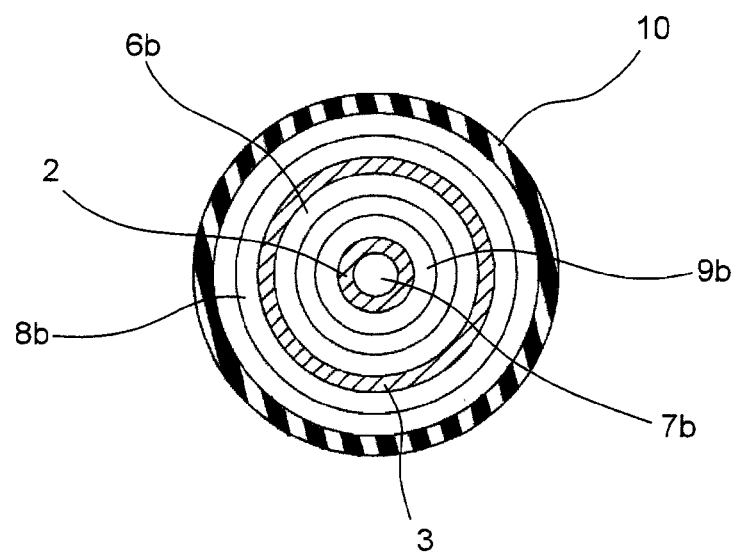
FIG. 6B is a B-B line cross-sectional view in FIG. 5A.
Figure 7A:
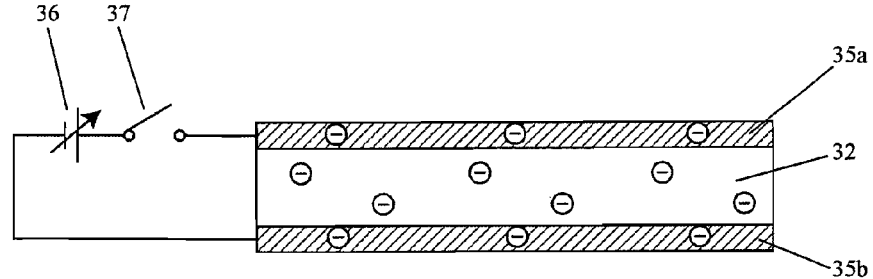
FIG. 7A is a view which schematically shows an artificial muscle actuator having a conventional structure.
Figure 7B:
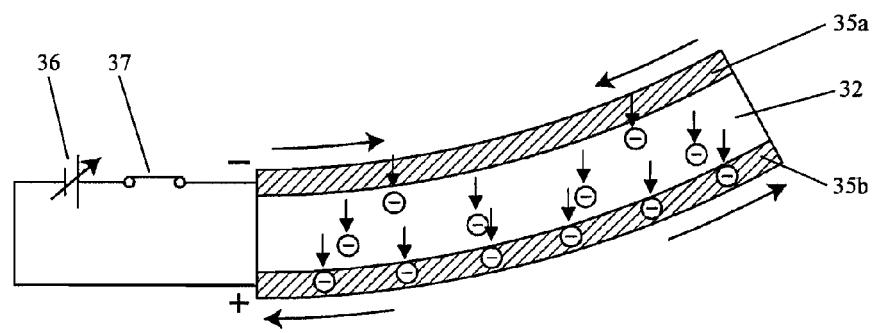
FIG. 7B is a view which schematically shows the artificial muscle actuator having the conventional structure.
Figure 7C:
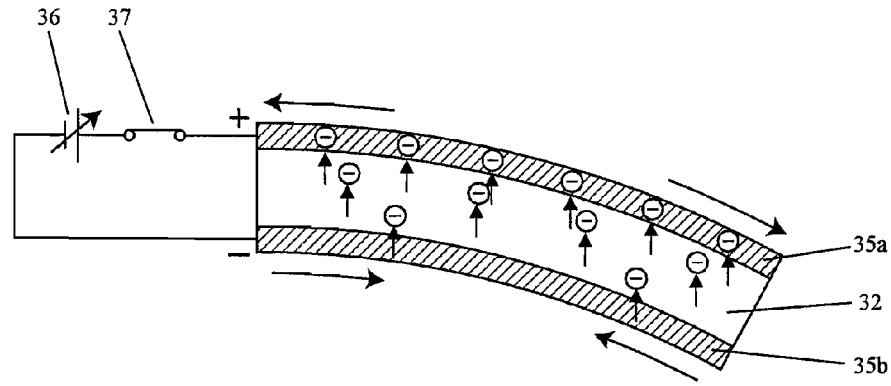
FIG. 7C is a view which schematically shows the artificial muscle actuator having the conventional structure.

FIG. 4 is a perspective view which schematically shows an artificial muscle actuator 1A which is one example of a polymer actuator in accordance with a second embodiment of the present invention. Moreover, FIGS. 5A, 5B, 5C, 5D, and 5E are X-X line cross-sectional views which show the operations of the artificial muscle actuator 1A. Moreover, FIGS. 6A and 6B respectively show an A-A line cross-sectional view and a B-B line cross-sectional view of FIG. 5A. Here, those parts which carry out the same functions as those of the first embodiment are indicated by the same reference numerals, and the overlapped explanations will be omitted.

In the second embodiment, the output of the tube-shaped film 2 of conductive polymer on the inside is designed so as to be directly transmitted to the outside as a reciprocating operation. This reciprocating operation is carried out by changing a displacement direction in cooperation with the potential difference given between the tube-shaped film 2 of conductive polymer on the inside and the tube-shaped film 3 of conductive polymer on the outside.

More specifically, in the second embodiment, there is no movable body 14 of the first embodiment, and the output of the actuator 1A is externally taken out by an output shaft 25 which is formed on the holding ring 7b, and allowed to freely move and pass through a through hole 13c formed in the center of the lower lid 13. A stopper 23e is secured to the output shaft 25, and a coil spring 24e serving as one example of the elastic member is sandwiched between the stopper 23e and the lower lid 13 in a manner so as to be compressed. With this arrangement, a force in the expanding direction is always applied to the tube-shaped film 2 of conductive polymer on the inside by the compressed coil spring 24e so that, when the tube-shaped film 2 of conductive polymer on the inside is expanded, a driving force in the expanding direction is also generated without being buckled. Here, the output shaft 25 is held by a sealing member 22 inside the through hole 13c of the lower lid 13 so as to freely move in the axial direction, while being restricted in the movement in the radial direction.

Here, only one conductive rod-shaped protrusion 27 is attached to the conductive holding ring 7a, and this is fitted to a fitting hole 12c of the insulating upper lid 12 so that the holding ring 7a is secured to the upper lid 12. Moreover, on the holding ring 7a, a through hole 38 having a T-letter shape in its cross section which allows the inner space of the tube-shaped film 2 of conductive polymer on the inside and the outer space thereof to always communicate with each other is formed so that an electrolyte solution 4 located inside and outside of the tube-shaped film 2 is allowed to freely move mutually through the through hole 38 interposed therebetween in response to the expansion and contraction of the tube-shaped film 2 of conductive polymer on the inside; thus, it is possible to prevent a pressure difference due to the electrolyte solution 4 located the inside and outside thereof from being applied to the tube-shaped film 2 of conductive polymer on the inside. Moreover, a wiring from the switch 28 is electrically connected to the holding ring 7a through the conductive rod-shaped protrusion 27 interposed therebetween.

Next, the following description will discuss functions of this artificial muscle actuator 1A.

The tube-shaped films 2 and 3 of conductive polymer and the states of the electric terminal 18 in FIGS. 5A, 5B, 5C, 5D, and 5E are respectively the same as those shown in FIGS. 2A, 2B, 2C, 2D, and 2E, and in the second embodiment also, by turning the switch 28 on, the same sequence of cycles as that of the first embodiment is repeated. Here, the point of difference from the first embodiment is that, since a displacement, as it is, generated by the tube-shaped film 2 of conductive polymer on the inside, is taken out by the output shaft 25 so that displacement operations generated by the actuator 1A correspond to reciprocating operations having an amplitude of d.

In the above sequence of cycles, the length of the tube-shaped film 2 of conductive polymer on the inside varies depending on a load to be applied to the output shaft 25, and with respect to the state as to what extent the tube-shaped film 2 of conductive polymer on the inside is expanded or contracted to, it is determined by the amount of anions which have been inserted into the tube-shaped film 2 of conductive polymer on the inside. That is, the state in which anions have been sufficiently inserted corresponds to the expanded state of the tube-shaped film 2 of conductive polymer on the inside, and the state in which anions have been sufficiently released from the tube-shaped film 2 of conductive polymer on the inside corresponds to the contracted state of the tube-shaped film 2 of conductive polymer on the inside. Here, the tube-shaped film 2 of conductive polymer on the inside is electrically connected to the tube-shaped film 3 of conductive polymer on the outside through the electrolyte solution 4 so as to form one portion of an electric circuit including the DC power supply 5a or 5b; thus, in response to the insertion and release of anions to and from the tube-shaped film 2 of conductive polymer on the inside, the release and insertion of anions are carried out from and to the tube-shaped film 3 of conductive polymer on the outside.

Moreover, since no mechanical interaction is exerted between the tube-shaped film 2 of conductive polymer on the inside and the tube-shaped film 3 of conductive polymer on the outside because of their contact through the electrolyte solution 4, it becomes possible to estimate what extent the tube-shaped film 2 of conductive polymer on the inside is expanded or contracted to, based upon the displacement of the tube-shaped film 3 of conductive polymer on the outside which is operated under a known load; thus, by allowing the tube-shaped film 3 of conductive polymer on the outside to have a displacement, the electric terminal 18 is switched between the electrodes 17a and 17b in its electric contact so that the tube-shaped film 2 of conductive polymer on the inside is reciprocatingly operated within the maximum amplitude d between the expanded state and the contracted state of the tube-shaped film 2 of conductive polymer on the inside, independent of the load applied to the output shaft 25.

As described above, in accordance with the second embodiment, since the potential difference between the tube-shaped film 2 of conductive polymer on the inside serving as one example of the first polymer structural member and the tube-shaped film 3 of conductive polymer on the outside serving as one example of the second polymer structural member is changed in response to a displacement of the tube-shaped film 3 of conductive polymer on the outside which is electrically connected to the tube-shaped film 2 of conductive polymer on the inside, but merely has a mechanically weaker connection to the tube-shaped film 2 of conductive polymer on the inside; therefore, since the actuator 1A can be operated in response to the expanded and contracted states of the tube-shaped film 3 of conductive polymer on the outside which correspond to the expanded and contracted states of the tube-shaped film 2 of conductive polymer on the inside, independent of the load to be applied to the tube-shaped film 2 of conductive polymer on the inside, it is possible to obtain a polymer actuator 1A which can achieve the maximum expanding and contracting operations independent of the load, without adding extra systems, such as a charge measuring device or a power sensor.

Here, the above various embodiments have discussed the anion operation; however, those embodiments can be applied to a cation driving operation which is derived from outgoing and incoming cations in the same manner.

Moreover, in the same manner, those embodiments can be applied to a structure in which the kinds of outgoing and incoming ions are different depending on the tube-shaped film 2 of conductive polymer on the inside and the tube-shaped film 3 of conductive polymer on the outside.

Here, the present embodiment has discussed a structure in which an organic conductive polymer in which the polymer itself has a conductive property is used as the polymer structural member having a conductive property; however, the conductive polymer structural member is not intended to be limited by this, and a polymer structural member having a conductor as a composite material may be used and the same functions and effects can be obtained. For example, a structural member in which a particle-shaped carbon material such as carbon fine particles is contained in a fluorine-based polymer is desirably used because the characteristics of the polymer structural member can be adjusted by the content of the carbon fine particles. Moreover, a structural member which uses a tube-shaped carbon material, such as carbon nanotubes, in place of the carbon fine particles, is desirably used because this structural member makes it possible to provide a stable conductive property when the polymer structural member is expanded and contracted. Here, not limited to carbon, the conductor to be contained in the polymer structural member may be prepared as a metal-based conductor.

Moreover, not limited to an oxidation-reduction reaction, the principle of expansion and contraction may be derived from a structural change in polymer, electrostatic repulsion, or the like. In any of these cases, since there is a correlation between displacements of the first polymer structural member and the second polymer structural member, the same operations can be carried out.

Furthermore, in the above various embodiments, coil springs are used so as to apply a driving force in the expanding direction to the polymer structural member having a conductive property; however, not limited to this method, the method for applying a driving force in the expanding direction may be achieved by applying a pulling force to the polymer structural member from outside by using a weight, or may be prepared by using a structural member which has a polymer having such strength as not to be buckled even upon expansion so that it may be operated as a simple body without any elastic element added thereto.

Moreover, the electrolyte retention layer is not necessarily limited to a liquid, and even a solid-state electrolyte such as a gel structure may be used as long as the solid-state electrolyte exerts such smoothness on the interface or flexibility of the solid-state electrolyte as to prevent the tub-shaped films 2 and 3 of the polymer structural member from receiving mechanical influences of mutual elastic deforms.

Moreover, the kinds of the potential difference to be applied between the first polymer structural member and the second polymer structural member are not necessarily limited to two kinds, and the kinds thereof may be increased on demand.

Furthermore, the potential-difference switching unit 100 used for changing a potential difference in response to a displacement of the second polymer structural member is not necessarily limited to the above system of the embodiment using a magnetic force, and any known techniques which execute switching operations in response to a displacement may be utilized.

Moreover, the power supply is desirably prepared as an inexpensive DC power supply; however, not limited to this, an AC power supply and a power supply or the like that outputs a voltage having a desired waveform may be utilized.

Any of these modifications are included in the present invention.

By properly combining the arbitrary embodiments of the aforementioned various embodiments, the effects possessed by the embodiments can be produced.

The polymer actuator in accordance with the present invention makes it possible to obtain an actuator which achieves the maximum expanding and contracting operations independent of the load, without adding extra systems, such as a charge measuring device or a power sensor, which is effectively utilized as an artificial muscle actuator or the like. More specifically, for example, the artificial muscle actuator of the present invention may be utilized as an arm tendon. Moreover, supposing that the movable body of the first embodiment is prepared as a fixed rail, the present invention may be used as an actuator for a self-advancing robot in which the actuator itself is allowed to advance and retreat relative to the fixed rail.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A polymer actuator comprising:
   a first polymer structural member having a conductive property;
   an electrolyte retention layer electrically connected to the first polymer structural member; and
   a second polymer structural member electrically connected to the first polymer structural member through the electrolyte retention layer, the electrolyte retention layer being interposed between the first and second polymer structural members, and having a conductive property,
   wherein, when a potential difference is applied between the first polymer structural member and the second polymer structural member, the first polymer structural member and the second polymer structural member expand and contract respectively, and
   when an external force is exerted on the first polymer structural member via an output shaft connected to the first polymer structural member, the potential difference between the first polymer structural member and the second polymer structural member is changed based on displacement due to expansion or contraction of the second polymer structural member.

2. A polymer actuator, comprising:
   a first polymer structural member having a conductive property;
   an electrolyte retention layer electrically connected to the first polymer structural member; and
   a second polymer structural member electrically connected to the first polymer structural member through the electrolyte retention layer, the electrolyte retention layer being interposed between the first and second polymer structural members, and having a conductive property,
   wherein, when a potential difference is applied between the first polymer structural member and the second polymer structural member, the first polymer structural member and the second polymer structural member expand and contract respectively, the polymer actuator further comprising:
   a displacement detection unit configured to detect displacement due to expansion or contraction of the second polymer structural member upon application of an external force to the first polymer structural member via an output shaft connected to the first polymer structural member; and
   a potential-difference switching unit configured to switch the potential difference to be applied between the first polymer structural member and the second polymer structural member to a different potential difference based upon the displacement detected by the displacement detection unit.

3. The polymer actuator according to claim 1, wherein either one or each of the first polymer structural member having the conductive property and the second polymer structural member having the conductive property is a structural member including an organic conductive polymer.

4. The polymer actuator according to claim 1, wherein either one or each of the first polymer structural member having the conductive property and the second polymer structural member having the conductive property includes a carbon material having the conductive property.

5. The polymer actuator according to claim 4, wherein the carbon material having the conductive property is a tube-shaped carbon material.

6. The polymer actuator according to claim 4, wherein the carbon material having the conductive property is a particle-shaped carbon material.

7. The polymer actuator according to claim 1, wherein the first polymer structural member having the conductive property and the second polymer structural member having the conductive property are structural members made from polymers having the same characteristics to an ambient environment.

8. A polymer actuator, comprising:
   a first polymer structural member having a conductive property;
   an electrolyte retention layer electrically connected to the first polymer structural member; and
   a second polymer structural member electrically connected to the first polymer structural member through the electrolyte retention layer, the electrolyte retention layer being interposed between the first and second polymer structural members, and having a conductive property,
   wherein when a potential difference is applied between the first polymer structural member and the second polymer structural member, the first polymer structural member and the second polymer structural member expand and contract, respectively, the polymer actuator further comprising:
   a displacement detection unit configured to detect displacement due to expansion or contraction of the second polymer structural member upon application of an external force to the first polymer structural member via an output shaft connected to the first polymer structural member; and
   a potential-difference switching unit configured to switch the potential difference to be applied between the first polymer structural member and the second polymer structural member to different potential differences based upon the displacement detected by the displacement detection unit, wherein, the potential-difference switching unit is configured such that, when the second polymer structural member is contracted so as to be greater or equal to a predetermined dimension, the potential difference to be applied between the first polymer structural member and the second polymer structural member is switched to a first potential difference which enables the second polymer structural member to carry out an expansion operation, and in contrast, when the second polymer structural member is expanded so as to be greater or equal to a predetermined dimension, the potential difference is switched to a second potential difference which enables the second structural member to carry out a contraction operation.

9. The polymer actuator according to claim 8, wherein the potential-difference switching unit is a switch configured to mechanically switch the potential difference to be applied between the first polymer structural member and the second polymer structural member by the expansion or contraction operation of the second polymer structural member between the first potential difference and the second potential difference.

10. The polymer actuator according to claim 1, wherein the potential difference to be applied between the first polymer structural member and the second polymer structural member is applied by a DC power supply.

11. The polymer actuator according to claim 1, wherein the first polymer structural member has a first end secured, and a ratchet claw is provided to a second end, the ratchet claw being configured to move in an expansion or contraction direction of the first polymer structural member in accordance with an expansion or contraction operation of the first polymer structural member, a rod-shaped movable body having ratchet teeth configured to engage the ratchet claw is provided so as to move substantially in a same direction as the expansion or contraction direction of the first polymer structural member, so that the ratchet claw and the ratchet teeth form a ratchet mechanism, and when the first polymer structural member is contracted, the ratchet claw and the ratchet teeth of the movable body are engaged with each other so that the ratchet claw and the movable body move in the contraction direction of the first polymer structural member, and, when the first polymer structural member is expanded, the ratchet claw is released from the ratchet teeth, and the ratchet claw moves in a direction reversed to the contracting direction relative to the movable body so that output of the first polymer structural member is transmitted to an outside only in one direction.

* * * * *